(12) United States Patent
Animesh et al.

(10) Patent No.: US 11,199,994 B1
(45) Date of Patent: Dec. 14, 2021

(54) DECOUPLING DATA REQUEST RATE FROM HARDWARE MEDIUM FOR ARCHIVAL DATA STORAGE DEVICES

(71) Applicant: Amazon Technologies, Inc., Seattle, WA (US)

(72) Inventors: Rishabh Animesh, Seattle, WA (US); Siddharth Shah, Seattle, WA (US); Anusha Dasarakothapalli, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 16/191,279

(22) Filed: Nov. 14, 2018

(51) Int. Cl.
*G06F 3/06* (2006.01)
*H04L 29/08* (2006.01)

(52) U.S. Cl.
CPC .......... *G06F 3/0659* (2013.01); *G06F 3/0604* (2013.01); *G06F 3/067* (2013.01); *H04L 67/1097* (2013.01)

(58) Field of Classification Search
CPC ...... G06F 3/0659; G06F 3/0604; G06F 3/067; H04L 67/1097
See application file for complete search history.

(56) References Cited

U.S. PATENT DOCUMENTS

| | | | | |
|---|---|---|---|---|
| 7,698,428 B2* | 4/2010 | Fatula, Jr. | ........... | G06F 11/1464 709/226 |
| 8,904,137 B1* | 12/2014 | Zhang | .................... | G06F 3/0608 711/165 |
| 9,858,209 B1* | 1/2018 | Genda | ................. | G06F 11/1451 |
| 2005/0149584 A1* | 7/2005 | Bourbonnais | ......... | G06F 16/256 |
| 2007/0079087 A1* | 4/2007 | Wang | ..................... | G06F 16/113 711/161 |
| 2010/0180094 A1* | 7/2010 | Min | ..................... | G06F 11/2058 711/162 |
| 2010/0257140 A1* | 10/2010 | Davis | ..................... | G06F 16/113 707/661 |
| 2012/0158666 A1* | 6/2012 | Anglin | ................ | G06F 11/1469 707/679 |
| 2014/0046906 A1* | 2/2014 | Patiejunas | ............. | G06F 16/907 707/661 |
| 2016/0132400 A1* | 5/2016 | Pawar | ..................... | G06F 11/14 707/679 |
| 2016/0142482 A1* | 5/2016 | Mehta | ................. | H04L 67/1095 709/203 |
| 2018/0316740 A1* | 11/2018 | Stockhammer | ......... | H04L 29/06 |
| 2019/0004516 A1* | 1/2019 | Liu | ....................... | G05D 1/0088 |

* cited by examiner

*Primary Examiner* — Tasnima Matin
(74) *Attorney, Agent, or Firm* — Davis Wright Tremaine LLP

(57) ABSTRACT

An archival data storage service identifies, in response to a request to retrieve data previously archived by the service, a set of data storage devices that collectively include the data. From the set of data storage devices, the archival data storage service identifies a set of bins, where a subset of the set of bins includes the data. Based on a deadline for fulfillment of the request, the archival data storage service generates a schedule for retrieval of the set of bins for obtaining the data. The schedule is provided to cause retrieval of the set of bins in accordance with the schedule.

20 Claims, 11 Drawing Sheets

DECOUPLING DATA REQUEST RATE FROM HARDWARE MEDIUM FOR ARCHIVAL DATA STORAGE DEVICES

BACKGROUND

Data storage systems have evolved and continue to evolve to keep up with the demands of the organizations that use them. Many organizations, for example, utilize data storage systems for, among other reasons, the purpose of data archiving, redundancy, and storage of large amounts of data. However, retrieval of archived data from these data storage systems can be difficult. As multiple requests to retrieve archived data from these data storage systems may be obtained within a short window of time, processing these multiple requests can be difficult and consume significant time and network bandwidth. Further, developing an optimized schedule for processing these multiple requests can be challenging. As these data storage systems change over time, preparing new optimized schedules for fulfillment of these multiple requests can also result in additional expense.

BRIEF DESCRIPTION OF THE DRAWINGS

Various techniques will be described with reference to the drawings, in which.

DETAILED DESCRIPTION

Figure 1:
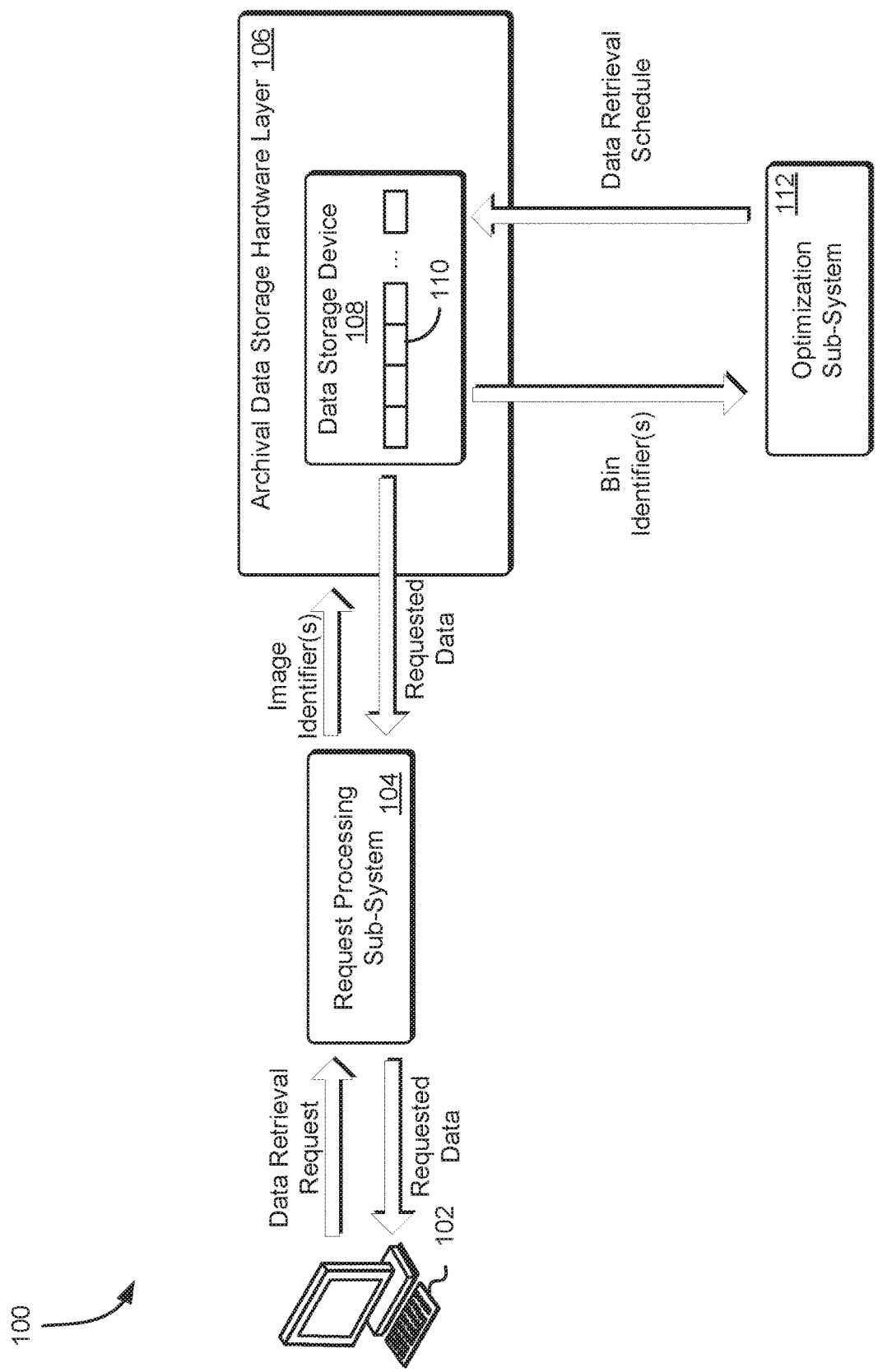
FIG. 1 shows an illustrative example of a system in which various embodiments can be implemented.

Techniques described and suggested herein relate to the computation of data retrieval bins for each data storage device of a set of data storage devices that comprise archived data in response to a data retrieval request to enable generation of an optimization schedule for retrieval of the data from the data storage bins. In an example, an archival data storage service obtains a request to retrieve archived data that is stored within a set of data storage devices of the archival data storage service. The request may specify a set of identifiers corresponding to the archived data and usable to identify the data storage devices that comprise the archived data. For instance, the archival data storage service may maintain a database that includes an entry for each archived data identifier and, for each entry, a corresponding identifier of a data storage device that maintains the archived data. In response to the request, the archival data storage service may assign a job identifier to the request. In an example, the job identifier is utilized to identify the obtained request and to identify, based on identifiers corresponding to the archived data to be retrieved and specified in the request, a set of data storage device images that collectively include the archived data.

In an example, the archival data storage service obtains, from an object-based data storage service, the data storage device header of each data storage device that comprises the data storage device images identified in response to the request. The data storage device header may specify the location, within the data storage device, of the archived data specified in the request. In an example, based on the information specified in the data storage device header obtained from the object-based data storage service, the archival data storage service computes a set of retrieval bins for the data storage device. A retrieval bin is a logical partition of the data storage device that comprises a consecutive set of data bytes as written on the data storage device. The retrieval bin may serve as the equivalent of a period of time (e.g., seconds, milliseconds, etc.) of device read time. Thus, the data storage device may be logically partitioned into a set of retrieval bins, where each retrieval bin corresponds to a period of time of device read time and, thus, may each comprise archived data written to the data storage device.

In an example, the archival data storage service determines, based on an evaluation of the data storage device header and the location of the requested archived data within the data storage device, the retrieval bins that comprise the requested archived data. The archival data storage service may generate a schedule for the processing of the retrieval bins of the data storage device to enable processing of the retrieval bins in accordance with the schedule. This schedule may be generated based on multiple received requests to obtain archived data from the data storage device. Thus, the archival data storage service may use the bins corresponding to each request, as well as the parameters (e.g., deadlines, priority, availability requirements, etc.) for each request, to generate the schedule for the processing of the retrieval bins of the data storage device. As the retrieval bins are processed by the archival data storage service, the archival data storage service may evaluate any newly received requests to obtain archived data and adjust the schedule based on the parameters of the newly received requests. For example, if a new request is received that has a higher priority than existing requests being processed, the archival data storage service may prioritize the retrieval bins associated with the new request over those of existing requests.

In an example, the archival data storage service processes each retrieval bin in the order specified in the schedule generated based on the parameters of each pending data retrieval request. As each retrieval bin is processed, the archival data storage service may stage the data from the retrieval bin in a data object maintained by the object-based data storage service, thus making the data available for compilation. The archival data storage service may monitor the processing of each bin to identify any requests that can be fulfilled based on the retrieval bins obtained and processed from the data storage device. If the archival data storage service determines that a pending request can be fulfilled, the archival data storage service may compile the data requested in the request and provide the data to fulfill the request. The archival data storage service may remove the request from the schedule of requests to be processed and select the next pending request sorted by a timeline point in the retrieval bins.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For instance, because each data storage device is divided into a set of retrieval bins, where each retrieval bin corresponds to a threshold period of time for retrieval of data within the retrieval bin, any retrieval request that includes the retrieval bin is within the period of time of an optimal solution for retrieval of the data from the retrieval bin. This enables processing of data from the retrieval bin in an order in which the data was written to the data storage device, regardless of the ordering of sets of data within the retrieval bin corresponding to different data retrieval requests. This provides an upper limit on the latency for obtaining data for any data retrieval request, regardless of the priority of the data retrieval request. Further, because the number of retrieval bins would encapsulate the entirety of the data stored within the data storage device, the scheduling of data retrieval from the data storage device can be determined on a per retrieval bin basis, thus providing an upper bound to the optimization problem of generating a schedule for retrieval of data in response to multiple requests. Thus, while new requests to obtain data from the data storage device are received, the schedule is bounded by the number of retrieval bins of the data storage device and not the number of requests, which can vastly exceed the number of retrieval bins. This reduces the number of reading operations within the data storage device, as all data is processed from a selected retrieval bin.

FIG. 1 shows an illustrative example of a system 100 in which various embodiments can be implemented. In the system 100, a client 102 of an archival data storage service submits a request to a request processing sub-system 104 of the archival data storage service to retrieve data previously archived by the archival data storage service. The archival data storage service may comprise a collection of computing resources that collectively operate to provide storage for data archiving and backup of customer data. The archival data storage service may thus persistently store data that may be infrequently accessed and for which long retrieval times are acceptable to a client 102 utilizing the service. A client 102 may interact with the archival data storage service to generate one or more archives. Each archive may represent one or more data files that may be combined to form the archive. Accordingly, a client 102, through one or more application programming interface (API) calls to the service, may upload and retrieve archives from the archival data storage service and monitor the retrieval of these archives, as each retrieval job may typically require several hours to complete. In an embodiment, the client 102 can specify, through the request to the request processing sub-system 104 of the archival data storage service, a deadline or other timing parameter for retrieval of the archived data. This deadline or other timing parameter may set an upper bound for the amount of time allotted for retrieval of the archived data.

The request processing sub-system 104 may be implemented on a computer system or other computing device, such as a computing device configured with one or more virtual machines operating via a hypervisor, may be implemented using hardware and software, and may comprise one or more processors and memory that stores executable instructions whose execution by the one or more processors causes the computer system to perform operations described herein. In response to the request from the client 102, the request processing sub-system 104 may determine whether the request has been previously processed. For instance, if the request from the client 102 specifies an identifier corresponding to a task for retrieval of the archived data, the request processing sub-system 104 may query a task metadata sub-system of the archival data storage service to determine whether the task has been completed. The task metadata sub-system may be implemented on a computer system or other computing device, such as a computing device configured with one or more virtual machines operating via a hypervisor, may be implemented using hardware and software, and may comprise one or more processors and memory that stores executable instructions whose execution by the one or more processors causes the computer system to perform operations described herein. The task metadata sub-system may access a task metadata database that includes an entry corresponding to each task performable by the archival data storage service.

If the entry corresponding to the task identifier specified by the client 102 indicates that the task has been completed, the task metadata sub-system may identify, from the entry, a location of the archived data requested by the client 102. In an embodiment, archived data retrieved from the archival data storage service is stored within a data object of an object-based data storage service. This enables rapid access to the data object for retrieval of the archived data once the task has been completed. The object-based data storage service may comprise a collection of computing resources that collectively operate to store data for a client. The data stored in the data storage service may be organized into data objects. The data objects may have arbitrary sizes except, in some instances, for certain constraints on size. Thus, the object-based data storage service may store numerous data objects of varying sizes. The object-based data storage service may operate as a key value store that associates data objects with identifiers of the data objects which may be used by the client 102 to retrieve or perform other operations in connection with the data objects stored by the object-based data storage service. Access to the object-based data storage service may be through API calls. If the task identified by the client 102 has been completed, the task metadata sub-system may provide the request processing sub-system 104 with the location (e.g., network address) of the data object that includes the archived data associated with the task. The request processing sub-system may access the data object to retrieve the archived data and may provide the archived data to the client 102 to fulfill the request. Alternatively, the request processing sub-system 104 may provide the network address of the data object to the client 102. The client 102 may utilize this network address to access the data object and obtain the archived data.

If the client 102 submits a new request to obtain archived data, the request processing sub-system 104 may determine that no task identifier has been assigned for the request. Accordingly, the request processing sub-system 104 may identify a unique task identifier that may be assigned to the request. Further, the request processing sub-system 104 may submit the new unique task identifier to the task metadata sub-system. This may cause the task metadata sub-system to generate a new entry in the task metadata database corresponding to this new unique task identifier. Thus, as the request is being processed, the client 102 may use the unique task identifier to determine the status of the request.

In an embodiment, in response to the request from the client 102, the request processing sub-system 104 evaluates the request to identify which data storage device images include the requested data. For instance, the request may include one or more identifiers corresponding to the data to be retrieved from the archival data storage service. The data to be retrieved may be included in one or more data storage device images, which may each be associated with a particular data storage device of the archival data storage service. Using the one or more identifiers corresponding to the data that is to be retrieved, the request processing sub-system 104 may query an image map database to identify the one or more data storage device images that comprise the requested data. For instance, the image map database may include an entry for each data storage device image maintained by the archival data storage service. Each entry may specify identifiers of data included in the data storage device image. Thus, the request processing sub-system 104 may identify one or more entries of data storage device images that comprise the requested data.

In an embodiment, each data storage device image includes a header that specifies the location of data stored within the data storage device associated with the data storage device image. The header for each data storage device image may be redundantly stored within one or more data objects of an object-based data storage service to enable rapid retrieval of the header for identification of the location of data stored within the data storage devices of the archival data storage service without need to access the data storage devices themselves. Using the identifiers corresponding to the data storage device images that include the requested archived data, the request processing sub-system 104 may query the object-based data storage service to obtain the relevant archival data storage device headers. This enables identification of the location of data without need to access the data storage devices themselves from the archival data storage service and, thus, interfering with read or write operations on to a data storage device.

In an embodiment, each data storage device image is divided into a set of retrieval bins. A retrieval bin is a logical partition of a data storage device image that comprises a consecutive set of bytes as written on to the data storage device. A retrieval bin may serve as the equivalent of a segment of read time from the data storage device. As an illustrative example, if ten second retrieval bins are generated for a data storage device image, at a read speed of 300 megabytes per second, a retrieval bin may be the equivalent of three gigabytes of data. Further, using this example, if a data storage device has a total storage capacity of 1.3 terabytes, the data storage device image may include approximately five hundred retrieval bins. In an embodiment, data stored within a retrieval bin is read in the order in which the bytes were written to the data storage device. This may prevent out-of-order read operations from being performed, thus avoiding random back and forth read operations of the retrieval bin. Since the size of the retrieval bin is bounded by the read time, retrieval of any data from a retrieval bin has an upper bound equivalent to the read time for the retrieval bin.

In an embodiment, the request processing sub-system 104 adds the identifiers corresponding to the data storage device images that comprise the requested data to a message queue in the form of an image retrieval task. The message queue may be accessed by an archival data storage hardware layer 106 of the archival data storage service to obtain image retrieval tasks associated with requests to obtain data from the archival data storage service. The archival data storage hardware layer 106 may be implemented on a computer system or other computing device, such as a computing device configured with one or more virtual machines operating via a hypervisor, may be implemented using hardware and software, and may comprise one or more processors and memory that stores executable instructions whose execution by the one or more processors causes the computer system to perform operations described herein. The archival data storage hardware layer 106 may obtain, from the message queue, a new image retrieval task and, based on the data storage service images identified in the task, compute the retrieval bins 110 of the each data storage device 108 that includes the identified data storage device images.

In an embodiment, the archival data storage hardware layer 106 generates a schedule for processing of the retrieval bins 110 required to obtain the data usable to fulfill the received requests. For instance, the archival data storage hardware layer 106 identifies, from the data storage device images, the retrieval bins 110 that include the data associated with the obtained task. The schedule may specify an ordering in which the retrieval bins 110 are to be retrieved and processed for the fulfillment of pending requests from the client 102 and other customers of the archival data storage service. For instance, the archival data storage hardware layer 106 may generate the ordering based on the deadline imposed by each client 102 for obtaining their archived data from the archival data storage service. Thus, the archival data storage hardware layer 106 may prioritize tasks corresponding to requests with shorter deadlines or time constraints over tasks corresponding to requests with longer deadlines or time constraints. In an embodiment, if a schedule for processing of the retrieval bins 110 was previously generated, the archival data storage hardware layer 106 updates the schedule based on the deadlines or other constraints of the obtained tasks.

The archival data storage hardware layer 106 provides the schedule and identifiers corresponding to the retrieval bins 110 comprising archived data to be retrieved to an optimization sub-system 112 for determining which data storage device 108 is to be loaded to obtain the archived data. The optimization sub-system 112 may be implemented on a computer system or other computing device, such as a computing device configured with one or more virtual machines operating via a hypervisor, may be implemented using hardware and software, and may comprise one or more processors and memory that stores executable instructions whose execution by the one or more processors causes the computer system to perform operations described herein. The optimization sub-system 112 evaluates the schedule and the retrieval bin identifiers to determine a schedule for loading the data storage devices of the archival data storage service that include the data storage device images comprising the requested data. Based on this newly created schedule, the optimization sub-system 112 may transmit a request to a data storage device library scheduler, which may load the first data storage device specified in the newly created schedule and initiate retrieval of each retrieval bin 110 in accordance with the schedule generated by the archival data storage hardware layer 106 and optimized by the optimization sub-system 112.

As each retrieval bin 110 is obtained from the data storage device 108, the optimization sub-system 112 may update the schedule for processing of the retrieval bins 110 of the data storage device 108 based on any newly obtained tasks. For instance, if a new task is obtained that has a shorter deadline than the existing tasks being processed, the optimization sub-system 112 may update the schedule to prioritize the processing of retrieval bins 110 corresponding to this new task over the retrieval bins comprising data associated with other existing tasks. In an embodiment, if a retrieval bin 110 is successfully retrieved from the data storage device 108 and is processed, the optimization sub-system 112 transmits a notification to the archival data storage hardware layer 106 to indicate that the retrieval bin 110 has been processed. This may cause the archival data storage hardware layer 106 to provide an updated schedule to the optimization sub-system 112 for optimization. This updated schedule may incorporate bin identifiers identified based on new tasks obtained from the request processing sub-system 104.

In an embodiment, data from a retrieval bin 110 obtained from a data storage device 108 is stored in a data object within the object-based data storage service. The archival data storage hardware layer 106, in response to receiving an indication that a retrieval bin 110 has been processed, may identify the tasks belong to the retrieval bin 110 in deadline order (e.g., the task having the shortest deadline period is identified first, etc.). The archival data storage hardware layer 106 may evaluate the task to determine whether the retrieval of the data from the retrieval bin 110 results in all retrieval bins associated with the task being processed. If so, the archival data storage hardware layer 106 may initiate compilation of the data from the retrieval bins 110 associated with the task to prepare the requested data. In an embodiment, the archival data storage hardware layer 106 prepares a retrieval bin manifest for the requested data and indicates that the task has been completed. The archival data storage hardware layer 106 may store the retrieval bin manifest in a data object of the object-based data storage service and obtain a network address corresponding to this data object. The archival data storage hardware layer 106 may provide this network address in a notification to the request processing sub-system 104 to indicate completion of the task associated with a received request from the client 102.

In response to receiving the notification from the archival data storage hardware layer 106, the request processing sub-system 104 may use the network address to access the data object that includes the compiled data. The request processing sub-system 104 may obtain, from the data object, the compiled data and provide the compiled data to the client 102 to fulfill the request. Alternatively, the request processing sub-system 104 may provide the network address of the data object to the client 102. The client 102 may use the network address to access the data object and retrieve the compiled data.

Figure 2:
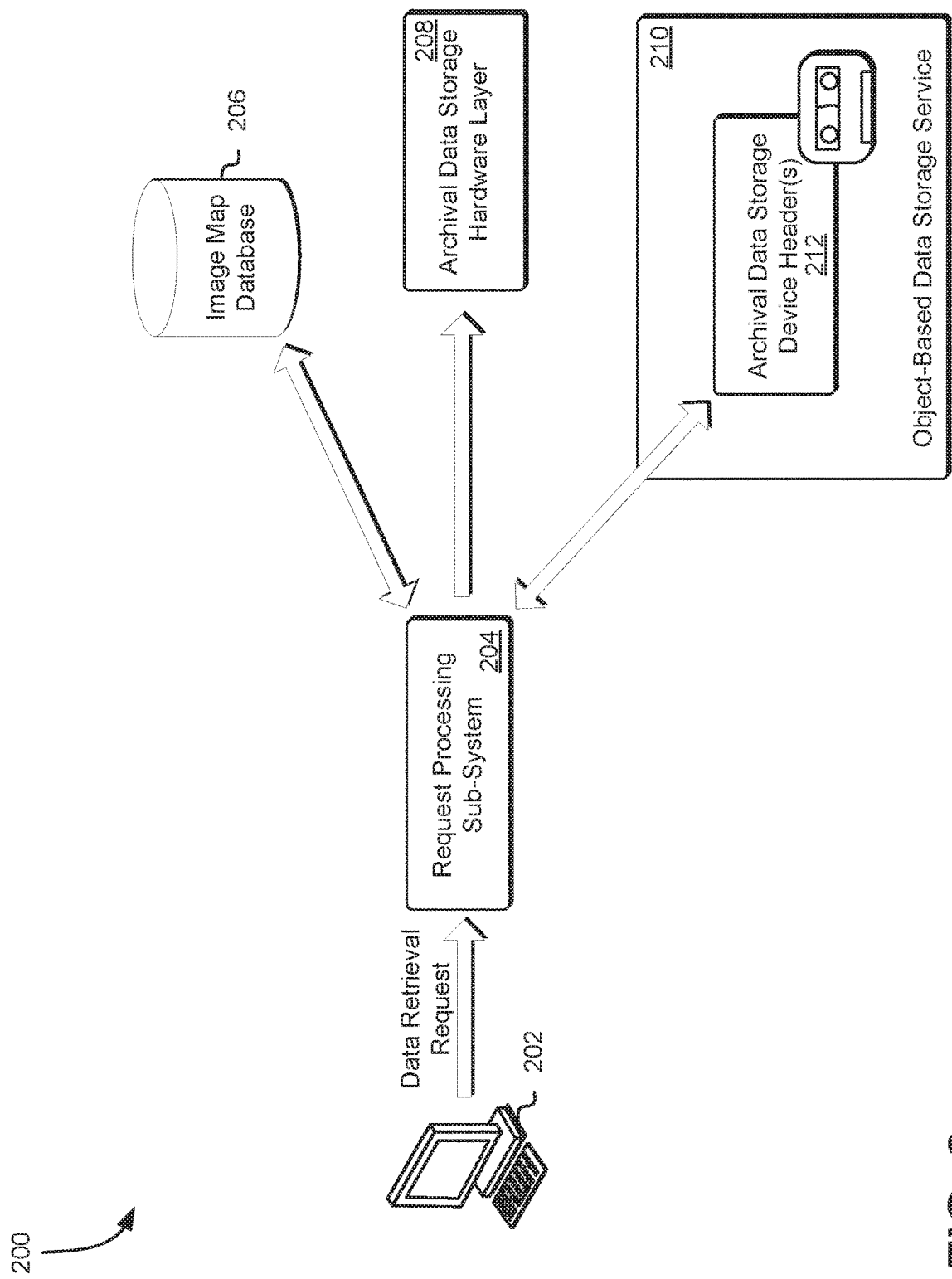
FIG. 2 shows an illustrative example of a system in which a request processing sub-system of an archival data storage service computes a set of bins on archived data images that comprise archived data in response a request to obtain the archived data in accordance with at least one embodiment.

FIG. 2 shows an illustrative example of a system 200 in which a request processing sub-system 204 of an archival data storage service computes a set of retrieval bins on archived data storage device images that comprise archived data in response a request to obtain the archived data in accordance with at least one embodiment. As noted above, a client 202 of the archival data storage service may submit a request to the request processing sub-system 204 to retrieve archived data stored in one or more data storage devices of the archival data storage service. The request may include identifiers corresponding to the archived data. These identifiers may be used to identify the data storage device images that comprise the archived data, as well as the data storage devices associated with the identified data storage device images.

In response to the request from the client 202, the request processing sub-system 204 determines the data retrieval type for the request, which defines the deadline for retrieval of the specified archived data. For example, the client 202 may specify, in the request, that the request is of a fast retrieval type, whereby the deadline for providing the first byte of the specified archived data is within a short period of time (e.g., two minutes and below, etc.). Alternatively, the client 202 may specify, in its request, that the request is of a standard retrieval type, whereby the deadline for providing the last byte of the specified archived data is within an intermediate period of time (e.g., between 3-5 hours, etc.). The client 202 may, as another example, specify that the request is of a cost-saving retrieval type, whereby the deadline for providing the last byte of the specified archived data is within a long period of time (e.g., equal to or greater than 12 hours, etc.). The cost to the client 202 for retrieval of the archived data may vary based on the retrieval type selected, whereby the expense may increase as the required period of time for retrieval of the archived data decreases. Thus, the request processing sub-system 204 may prioritize requests having a shorter deadline for retrieval of the specified archived data over requests that may have a longer deadline.

As noted above, if the client 202 submits a new request to obtain archived data, the request processing sub-system 204 may determine that no task identifier has been assigned for the request. Accordingly, the request processing sub-system 204 may identify a unique task identifier that may be assigned to the request. Further, the request processing sub-system 204 may submit the new unique task identifier to a task metadata sub-system, which may maintain a database comprising entries corresponding to unique task identifiers for tasks involving retrieval of archived data from the archival data storage service. This may cause the task metadata sub-system to generate a new entry in the task metadata database corresponding to this new unique task identifier. As the request submitted by the client 202 is being processed, the client 202 may submit a request to the request processing sub-system to determine the status of the request to obtain the archived data. The request processing sub-system 204 may provide the unique task identifier to the task metadata sub-system, which may use the unique task identifier to determine the status of the request to obtain the archived data and provide this status to the client 202 via the request processing sub-system 204.

In response to the request from the client 202, the request processing sub-system 204 may evaluate the request to identify which data storage device images include the requested data. For instance, the request may include one or more identifiers corresponding to the data to be retrieved from the archival data storage service. In an embodiment, the request processing sub-system 204 accesses an image map database 206 of the archival data storage service to identify the data storage device images that comprise the requested archived data. The image map database 206 may include an entry for each data storage device image maintained by the archival data storage service. Each entry may specify identifiers corresponding to the archived data included in the corresponding data storage image. Thus, the request processing sub-system 204 may query the image map database 206, using the supplied identifiers corresponding to the data to be retrieved, to identify the data storage device images that include the data to be retrieved.

In an embodiment, each data storage device image includes a header 212 that specifies the location of data stored within the data storage device associated with the data storage device image. The header 212 for each data storage device image may be redundantly stored within one or more data objects of an object-based data storage service 210 to enable rapid retrieval of the header 212 for identification of the location of data stored within the data storage devices of the archival data storage service without need to access the data storage devices themselves. This may reduce the number of operations on the data storage devices, thus preventing possible interruption of read and/or write operations performable by the data storage devices. Using the identifiers corresponding to the data storage device images that include the requested archived data, the request processing sub-system 204 may query the object-based data storage service 210 to obtain the relevant archival data storage device headers 212. The header 212 may specify a plurality of byte ranges corresponding to data stored within the corresponding data storage device. For instance, for a range of bytes within a data storage device, the header 212 may specify identifiers corresponding to data stored within this range of bytes. Alternatively, the header 212 may specify, for each byte of the data storage device, an identifier corresponding to the data stored within the byte. As another alternative, the header 212 may specify ranges corresponding to timeline points during which data was stored within the data storage device. Thus, a query of the header 212 may specify a particular time at which data was stored within the archival data storage service such that the particular time may be used to identify the data storage device that stores the data and the byte range that includes the data.

In an embodiment, the request processing sub-system 204 adds the identifiers corresponding to the data storage device images that comprise the requested data and the location of the requested data within each corresponding data storage device to a message queue in the form of an image retrieval task. The message queue may be accessed by an archival data storage hardware layer 208 of the archival data storage service to obtain image retrieval tasks associated with requests to obtain data from the archival data storage service. The archival data storage hardware layer 208 may obtain, from the message queue, a new image retrieval task and, based on the data storage service images and the locations of the requested data identified in the task, compute the retrieval bins of the each data storage device that includes the identified data storage device images and the data to be retrieved.

Figure 3:
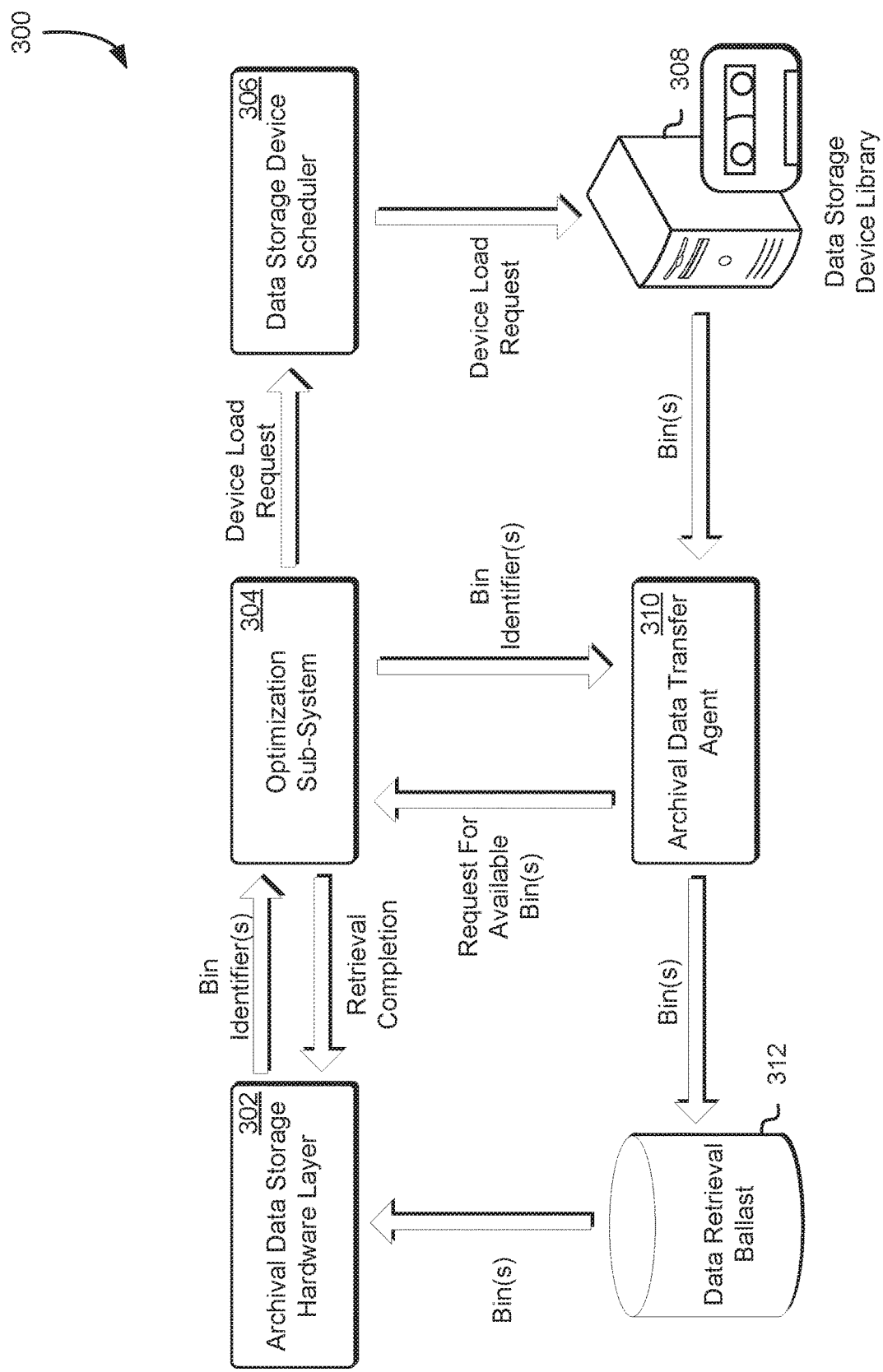
FIG. 3 shows an illustrative example of a system in which an archival data storage hardware layer obtains a set of bins comprising archived data based on an optimization schedule generated by an optimization sub-system of an archival data storage service in accordance with at least one embodiment.

FIG. 3 shows an illustrative example of a system in which an archival data storage hardware layer 302 obtains a set of retrieval bins comprising archived data based on an optimization schedule generated by an optimization sub-system 304 of an archival data storage service in accordance with at least one embodiment. In the system 300, the archival data storage hardware layer 302 may obtain a set of image retrieval tasks from a messaging queue. These image retrieval tasks may correspond to requests from customers of the archival data storage service to retrieve data stored within one or more data storage devices of the archival data storage service. Further, each image retrieval task may specify a deadline for fulfillment of the requests included in the task. This may be utilized to determine the priority in which retrieval of data for a particular request is to be performed in relation to other existing requests being processed by the archival data storage service.

In response to an image retrieval task, the archival data storage hardware layer 302 computes the retrieval bins the image retrieval task belong to on the corresponding data storage device image and schedules the retrieval of the data from the retrieval bins. The size of each retrieval bin may determine the time a data storage device spends in reading a particular retrieval bin. The size of each retrieval bin, in an embodiment, is selected such that the total number of retrieval bins enable avoidance of significant time lag involved in changing read directions within a data storage device and to account for the potential impact of performing serpentine (e.g., back and forth) read operations within a data storage device. The retrieval bin size may be a constant value (e.g., a consistent number of seconds of read operation time, etc.) to enable rapid retrieval of data from each retrieval bin while providing an upper bound for the number of retrieval bins for a data storage device. Additionally, or alternatively, the retrieval bin size may be dynamically selected based on client traffic on a particular data storage device image. In an embodiment, a data storage device image can be divided into retrieval bins of varying sizes based on the client traffic on the data storage device image. For instance, segments of the data storage device image that are frequently accessed may be apportioned a larger retrieval bin size to enable retrieval of data that is requested more often than other data within the data storage device image.

The archival data storage hardware layer 302 may generate a schedule for processing of the computed retrieval bins based on the deadline for each client request to obtain archived data. For instance, the archival data storage hardware layer 302 may identify, for each client request, the retrieval bins that comprise the data usable to fulfill the request. Based on the deadline for each client request specified in the image retrieval task, the archival data storage hardware layer 302 may construct a schedule for processing of the retrieval bins comprising the data specified in the client requests. The schedule may span multiple data storage device images, as the archival data storage hardware layer 302 may process multiple image retrieval tasks simultaneously. The archival data storage hardware layer 302 may transmit this schedule, along with the corresponding retrieval bin identifiers for the retrieval bins to an optimization sub-system 304 of the archival data storage service.

As noted above, the optimization sub-system 304 may be implemented on a computer system or other computing device, such as a computing device configured with one or more virtual machines operating via a hypervisor, may be implemented using hardware and software, and may comprise one or more processors and memory that stores executable instructions whose execution by the one or more processors causes the computer system to perform operations described herein. The optimization sub-system 304, in an embodiment, evaluates the schedule and the retrieval bin identifiers from the archival data storage hardware layer 302 to determine a schedule for loading the data storage devices of the archival data storage service that comprise the data identified in the image retrieval tasks processed by the archival data storage hardware layer 302.

An optimization sub-system 304 may exist for each data storage device library 308 of the archival data storage service. The optimization sub-system 304 may monitor the state of its assigned data storage device library 308 and prepare, based on the state of the data storage device library 308 and the schedule from the archival data storage hardware layer 302, a schedule for loading of the data storage devices that comprise the retrieval bins specified in the schedule from the archival data storage hardware layer 302. The schedule prepared by the optimization sub-system 304 corresponds to every data storage device library 308 of the archival data storage service.

Each data storage device library 308 may comprise a set number of data storage devices and a set number of data operation systems that may access the data storage devices to perform read and/or write operations on the data storage devices. The number of data storage devices and the number of data operation systems may define the system resource limits per data storage device library 308. The data retrieval requests from the customers of the archival data storage service may be randomly spread across multiple data storage device libraries 308 and, within a data storage device library 308, randomly spread across multiple data storage devices. Thus, the optimization sub-system 304 may generate its schedule based on the on the resource utilization, resource health, and the incoming request rate for retrieval of data from the various data storage devices of the various data storage device libraries 308.

The optimization sub-system 304 may inject an explicit preemption into the schedule if the schedule from the archival data storage hardware layer 302 indicates prioritization of a particular client request to obtain archived data from the archival data storage service. This may cause the optimization sub-system 304 to indicate, in the schedule, that a particular data storage device is to be unloaded in order to enable loading of another data storage device that may have the retrieval bins necessary to obtain data usable to fulfill the prioritized client request. This may ensure that the optimization sub-system 304 has visibility as to which data storage devices have been currently loaded and are serving client data retrieval requests.

In an embodiment, the optimization sub-system 304 interacts with a corresponding data storage device scheduler 306 to provide the newly generated schedule and issue data storage device loading requests. The data storage device scheduler 306 may be implemented on a computer system or other computing device, such as a computing device configured with one or more virtual machines operating via a hypervisor, may be implemented using hardware and software, and may comprise one or more processors and memory that stores executable instructions whose execution by the one or more processors causes the computer system to perform operations described herein. The data storage device scheduler 306 may process the request from the optimization sub-system 304 and load, from the data storage device library 308, one or more data storage devices for retrieval of the specified retrieval bins. In an embodiment, if the one or more data storage devices are loaded successfully, the data storage device scheduler 306 transmits a notification to the optimization sub-system 304 to indicate that the one or more data storage devices have been loaded successfully.

If the one or more data storage devices are loaded successfully, the optimization sub-system 304 may transmit the schedule for obtaining the retrieval bins from the one or more data storage devices to an archival data transfer agent 310 of the archival data storage service. The archival data transfer agent 310 may be implemented on a computer system or other computing device, such as a computing device configured with one or more virtual machines operating via a hypervisor, may be implemented using hardware and software, and may comprise one or more processors and memory that stores executable instructions whose execution by the one or more processors causes the computer system to perform operations described herein. The archival data transfer agent 310 may interact with the data storage devices of the data storage device library 308 to obtain the retrieval bins from these data storage devices. In an embodiment, the archival data transfer agent 310 constructs an optimized ordering for retrieval of the retrieval bins identified by the optimization sub-system 304. For instance, the archival data transfer agent 310 may determine which data storage devices have been loaded successfully and, based on this, generate the optimized ordering for retrieval of the retrieval bins in these data storage devices. The optimized ordering for retrieval of the retrieval bins may be based on the prioritization of client requests to obtain archived data from the archival data storage service, as discussed above.

In an embodiment, if a data storage device library 308 is rendered inoperative or is otherwise unavailable, the optimization sub-system 304 re-issues its schedule to data storage device schedulers of other data storage device libraries that include copies of the requested data. This may cause these other data storage device schedulers to load the corresponding data storage devices of these other data storage device libraries to obtain the copies of the retrieval bins that include the requested data. This may result in parity (e.g., multiple) retrieval bin retrievals for the same data from various data storage device libraries.

The archival data transfer agent 310 may retrieve each retrieval bin from the loaded data storage devices in accordance with the schedule from the optimization sub-system 304 and based on which data storage devices of the data storage device library 308 have actually been loaded. The archival data transfer agent 310 may retrieve a single retrieval bin at a time. Once a retrieval bin has been obtained from the data storage device library 308, the archival data transfer agent 310 may transmit a completion notification to the optimization sub-system 304 to indicate that the retrieval bin has been obtained. This may cause the optimization sub-system 304 to coordinate with the archival data storage hardware layer 302 to determine whether the schedule for retrieval of the retrieval bins is to be updated based on newly obtained data retrieval requests, as any of these newly obtained data retrieval requests may indicate a higher priority for retrieving data from the data storage device library 308 or other device libraries.

Once a retrieval bin has been obtained, the archival data transfer agent 310 may stage the data from the retrieval bin in a data retrieval ballast 312 maintained by the object-based data storage service. The archival data storage hardware layer 302 may receive a notification from the optimization sub-system 304 that the data associated with the particular retrieval bin is now available in the data retrieval ballast 312. This notification may cause the archival data storage hardware layer 302 to access the data retrieval ballast 312. For each client request, the archival data storage hardware layer 302 may evaluate the data from the retrieved retrieval bins to determine whether the data required to fulfill a client request is now available. If so, the archival data storage hardware layer 302 may compile the data from the retrieval bins stored in the data retrieval ballast 312 and transmit the compiled data to the client to fulfill the client request. Additionally, the archival data storage hardware layer may indicate, by updating its schedule, that the client request has been fulfilled.

Figure 4:
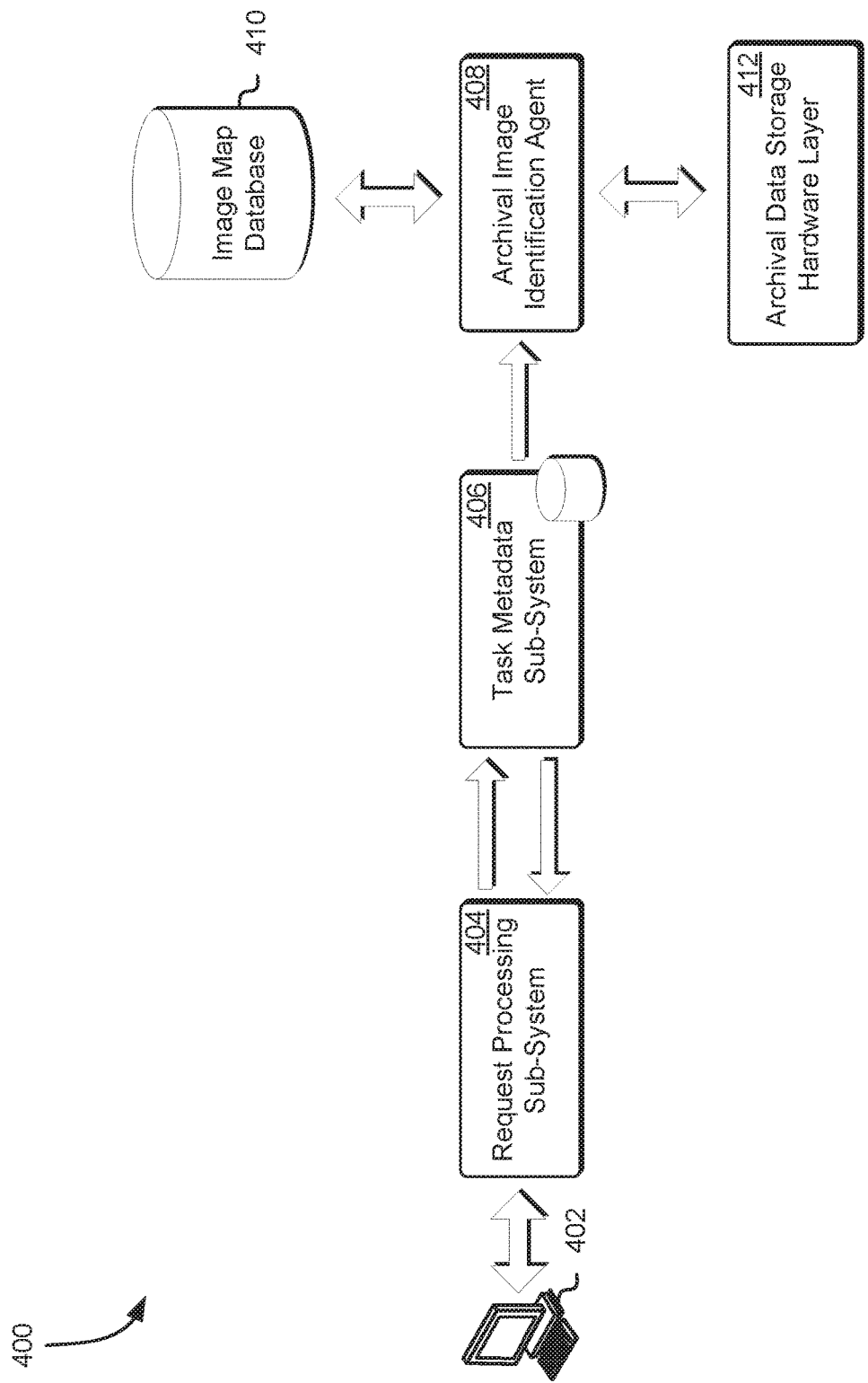
FIG. 4 shows an illustrative example of a system in which a request to obtain archived data is processed to identify a set of data images usable by an archival data storage hardware layer to compute a set of bins for each data image in accordance with at least one embodiment.

FIG. 4 shows an illustrative example of a system 400 in which a request to obtain archived data is processed to identify a set of data images usable by an archival data storage hardware layer 412 to compute a set of retrieval bins for each data image in accordance with at least one embodiment. In the system 400, a request processing sub-system 404 of the archival data storage service obtains (e.g., receives) from a client 402 of the archival data storage service a request to retrieve data archived within one or more data storage devices of the archival data storage service. The request may specify a task identifier corresponding to a previous request from the client 402 to initiate retrieval of certain data from the archival data storage service. The task identifier may be unique to the initial data retrieval request. Alternatively, if the request from the client 402 is to initiate retrieval of certain data from the archival data storage service, rather than including a task identifier, the request may specify one or more identifiers corresponding to the data that is to be received. These identifiers may have been previously provided to the client 402 upon fulfillment of a request to archive the data within the archival data storage service.

In response to the request from the client 402, the request processing sub-system 404 may determine whether the request has been previously processed. For instance, if the request from the client 402 specifies an identifier corresponding to a task for retrieval of the archived data, the request processing sub-system 404 may query a task metadata sub-system 406 of the archival data storage service to determine whether the task has been completed. The task metadata sub-system 406 may access a task metadata database that includes an entry corresponding to each task performable by the archival data storage service. The task metadata database may include an entry corresponding to each received request to obtain archived data from the archival data storage service. Each entry may specify the status of the corresponding request. For instance, if the request is being processed by the archival data storage service, the entry corresponding to this request may specify that the request is being processed. Alternatively, if the data associated with the request has been retrieved, the entry corresponding to this request may specify a network address of a data object maintained by the object-based data storage service that includes the retrieved data.

Based on the status of the request, the task metadata sub-system 406 may transmit a response to the request processing sub-system 404 that indicates the status of the client's request. For instance, if the requested data has been retrieved, the task metadata sub-system 406 may provide the request processing sub-system 404 with the network address of the data object that includes the retrieved data. This may cause the request processing sub-system 404 to access the data object to obtain the data and to provide the data to the client 402 to fulfill the request. Alternatively, the request processing sub-system 404 may provide the network address of the data object to the client 402 to enable the client 402 to access the data object to retrieve the requested data. If the request from the client 402 is to initiate retrieval of data from the archival data storage service, the task metadata database may not include an entry corresponding to this request. Thus, the task metadata sub-system 406 may generate a unique task identifier corresponding to this request and add a new entry to the task metadata database corresponding to this newly generated unique task identifier. The new entry may specify the data that is to be retrieved, as well as the status of the request itself (e.g., pending).

In an embodiment, if the request from the client 402 is to initiate retrieval of data from the archival data storage service, the task metadata sub-system 406 transmits the request to an archival image identification agent 408. The archival image identification agent 408 may be implemented on a computer system or other computing device, such as a computing device configured with one or more virtual machines operating via a hypervisor, may be implemented using hardware and software, and may comprise one or more processors and memory that stores executable instructions whose execution by the one or more processors causes the computer system to perform operations described herein. The archival image identification agent 408 may evaluate the request to identify which data storage device images include the requested data.

In an embodiment, the archival image identification agent 408 queries an image map database 410 to identify the data storage device images that comprise the data specified in the request. For instance, the request may include one or more identifiers corresponding to the data to be retrieved from the archival data storage service. The data to be retrieved may be included in one or more data storage device images, which may each be associated with a particular data storage device of the archival data storage service. Using the one or more identifiers corresponding to the data that is to be retrieved, the archival image identification agent 408 may query the image map database 410 to identify the one or more data storage device images that comprise the requested data. For instance, the image map database 410 may include an entry for each data storage device image maintained by the archival data storage service. Each entry may specify identifiers of data included in the data storage device image. Thus, the archival image identification agent 408 may identify one or more entries of data storage device images that comprise the requested data.

In an embodiment, the archival image identification agent 408 adds the identifiers corresponding to the data storage device images that comprise the requested data to a message queue in the form of an image retrieval task. The message queue may be accessed by an archival data storage hardware layer 412 of the archival data storage service to obtain image retrieval tasks associated with requests to obtain data from the archival data storage service. The archival data storage hardware layer 412 may obtain, from the message queue, a new image retrieval task and, based on the data storage service images identified in the task, compute the retrieval bins of the each data storage device that includes the identified data storage device images. In an embodiment, the archival data storage hardware layer 412 accesses a data object of an object-based data storage service that includes the data storage device header associated with each data storage device image specified in the image retrieval task. The data storage device header may specify the location of data within the data storage device. Thus, when the archival data storage hardware layer 412 computes, for each data storage device image, a set of retrieval bins, the archival data storage hardware layer 412 may use the data storage device header to identify which retrieval bins comprise the data identified in the image retrieval task. Further, the archival data storage hardware layer may use the prioritization of the image retrieval tasks and of the client requests to determine an ordering in which the retrieval bins are to be processed in order to fulfill the client requests according to the prioritization of these client requests.

Figure 5:
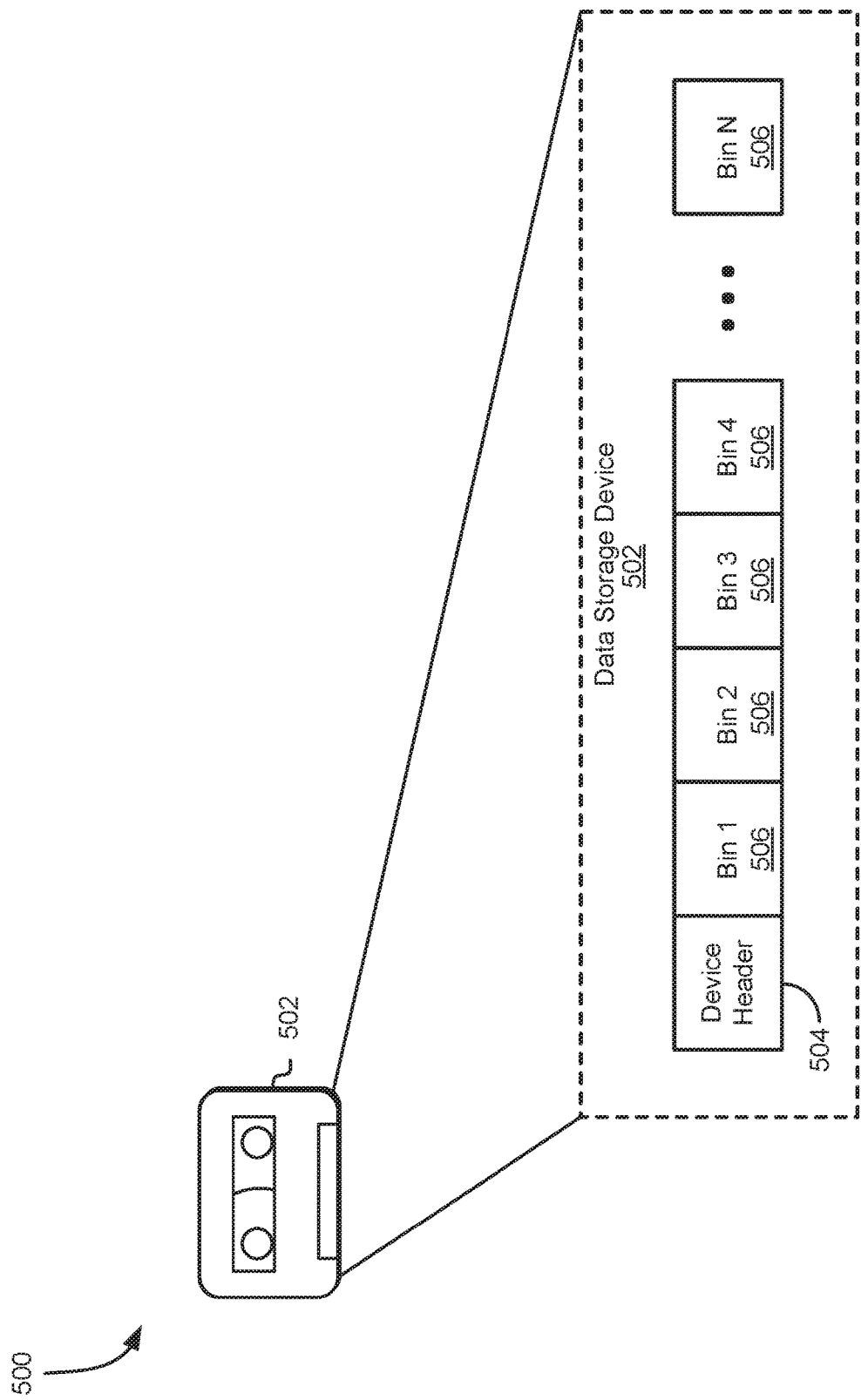
FIG. 5 shows an illustrative example of a system in which a data image stored on a data storage device is divided into a set of bins in accordance with at least one embodiment.

FIG. 5 shows an illustrative example of a system 500 in which a data storage device image stored on a data storage device 502 is divided into a set of retrieval bins 506 in accordance with at least one embodiment. In the system 500, a data storage device 502 maintains a data storage device image that includes archived data for a slew of clients of the archival data storage device. In an embodiment, the data storage device 502 is a tape drive that enables read and write operations on a magnetic tape. While tape drives are used extensively throughout the present disclosure for the purpose of illustration, other types of data storage may be used including, but not limited to, hard drives, solid state drives, flash drives, and the like.

The data storage device image may comprise a data storage device header 504 and the data stored in the data storage device, which may be divided into a set of retrieval bins 506 by an archival data storage hardware layer. The data storage device header 504 may include metadata associated with the data stored within the data storage device 502. For instance, the data storage device header 504 may specify identifiers corresponding to the data stored within the data storage device 502. Further, the data storage device header 504 may specify the location of data associated with each identifier within the data storage device 502. For instance, if the data storage device 502 comprises a particular number of bytes, the data storage device header 504 may specify which bytes of the data storage device 502 include data corresponding to a particular data identifier. In an embodiment, the data storage device header 504 is redundantly stored in a data object of an object-based data storage service. This enables identification of the data storage devices that store data specified in a client request for retrieval of the data without need to access the data storage device 502 to make this determination. Thus, an archival image identification agent, as described above in connection with FIG. 4, may evaluate an image map database, which may include an entry corresponding to each data storage device header 504 of the data storage devices 502.

In an embodiment, the archival data storage hardware layer of the archival data storage service computes, for a data storage device image specified in an image retrieval task, a set of retrieval bins 506 for the data storage device 502 corresponding to the data storage device image. The size of each retrieval bin 506 may determine the time a data storage device 502 spends in reading a particular retrieval bin 506. The size of each retrieval bin 506, in an embodiment, is selected such that the total number of retrieval bins 506 enable avoidance of significant time lag involved in changing read directions within a data storage device 502 and to account for the potential impact of performing serpentine (e.g., back and forth) read operations within a data storage device 502. The retrieval bin size may be a constant value (e.g., a consistent number of seconds of read operation time, etc.) to enable rapid retrieval of data from each retrieval bin 506 while providing an upper bound for the number of retrieval bins 506 for a data storage device 502. Additionally, or alternatively, the retrieval bin size may be dynamically selected based on client traffic on a particular data storage device 502. In an embodiment, a data storage device image can be divided into retrieval bins 506 of varying sizes based on the client traffic on the data storage device image. For instance, segments of the data storage device image that are frequently accessed may be apportioned a larger retrieval bin size to enable retrieval of data that is requested more often than other data within the data storage device image.

Figure 6:
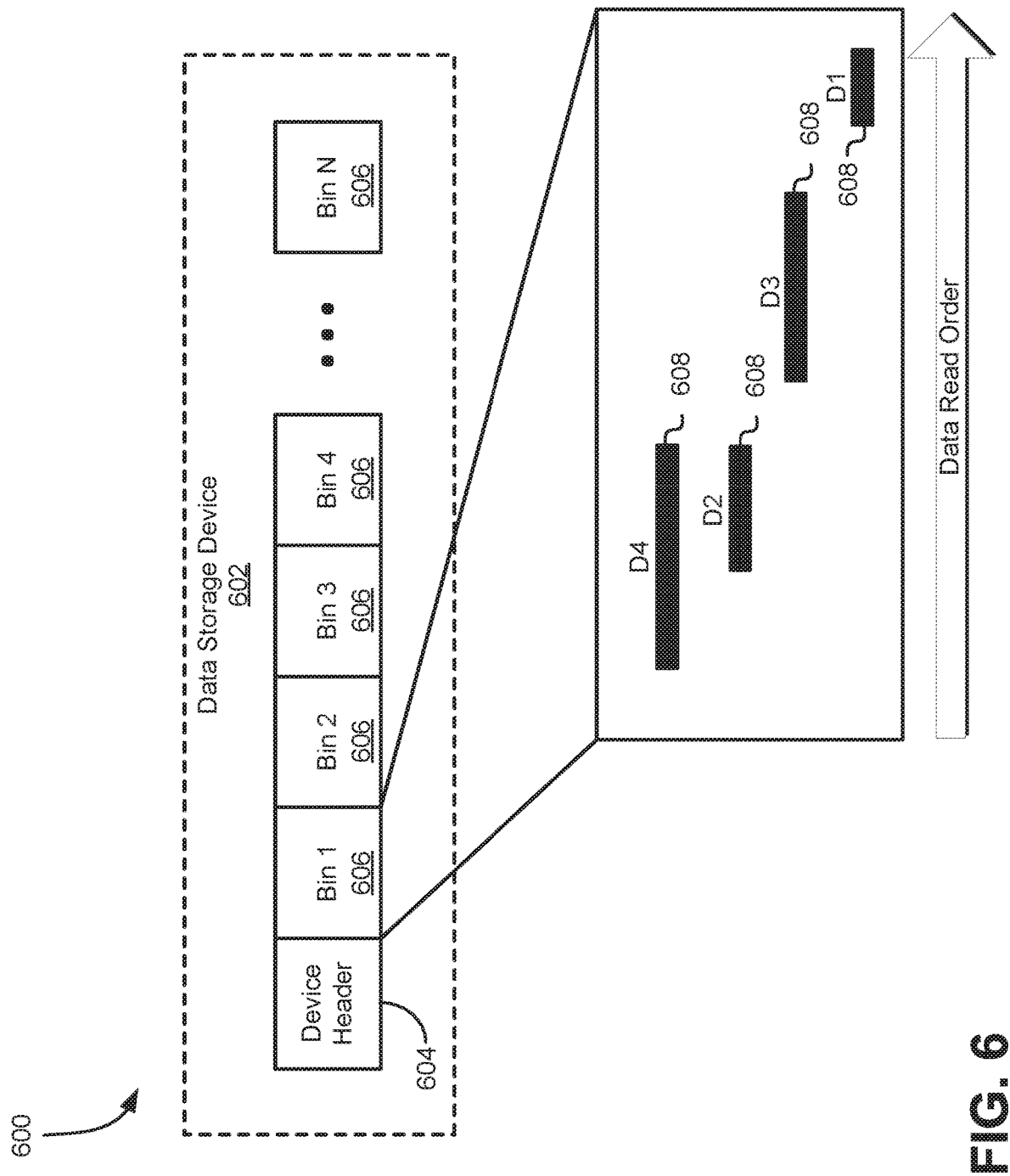
FIG. 6 shows an illustrative example of a system in which archived data within a bin is read in the order in which the archived data was written into the data storage device in accordance with at least one embodiment.

FIG. 6 shows an illustrative example of a system 600 in which archived data 608 within a retrieval bin 606 is read in the order in which the archived data 608 was written into the data storage device 602 in accordance with at least one embodiment. In the system 600, the data storage device 602 may include a data storage device image, which may comprise a data storage device header 604 and a set of retrieval bins 606 defined by the archival data storage hardware layer of the archival data storage service. Each retrieval bin 606 may include archived data 608 for a variety of different customers of the archival data storage service or otherwise associated with different requests to obtain archived data.

As noted above, a retrieval bin 606 may be defined as a consecutive set of bytes of a data storage device 602 as written on to a partition of the data storage device 602. Archived data 608 within a retrieval bin 606 of the data storage device 602 may be processed in the order the bytes corresponding to the archived data 608 were written to the data storage device 602. Thus, no out-of-order read operations may be performed within a retrieval bin 606 which may result in avoiding random back-and-forth read operations within a retrieval bin 606. In an embodiment, a read operation that involves a retrieval bin 606 is performed such that the archived data 608 included within the retrieval bin 606 is read completely. Thus, there may be no partial read operations performed on a retrieval bin 606.

As illustrated in FIG. 6, the retrieval bin 606 includes four distinct sets of archived data 608, each associated with four different data retrieval requests. Each data retrieval request may have a different deadline for retrieval of the archived data 608. For instance, as illustrated in FIG. 6, the deadlines for obtaining the each set of archived data 608 (e.g., D1-D4, where D1 represents the earliest deadline and D4 represents the latest deadline, with the period of time for each deadline increases from D1-D4) may differ from the order in which each set of archived data 608 was written to the data storage device 602. Thus, because a retrieval bin 606 is processed in the order of the bytes written to the data storage device 602, a read operation on the retrieval bin 606 may result in obtaining sets of archived data 608 within the retrieval bin 606 in an ordering that is agnostic to the request deadlines for retrieval of the sets of archived data 608.

However, since each retrieval bin 606 is time bounded (e.g., a retrieval bin 606 corresponds to a threshold period of time for performance of a read operation of the retrieval bin 606), all sets of archived data 608 may be retrieved from the retrieval bin 606 within the threshold period of time for performance of the read operation on the retrieval bin 606. Thus, the archival data storage hardware layer may utilize the deadline requirements for each client request to determine the size of each retrieval bin 606 of a data storage device image such that the deadline requirements for each client request can be satisfied.

Figure 7:
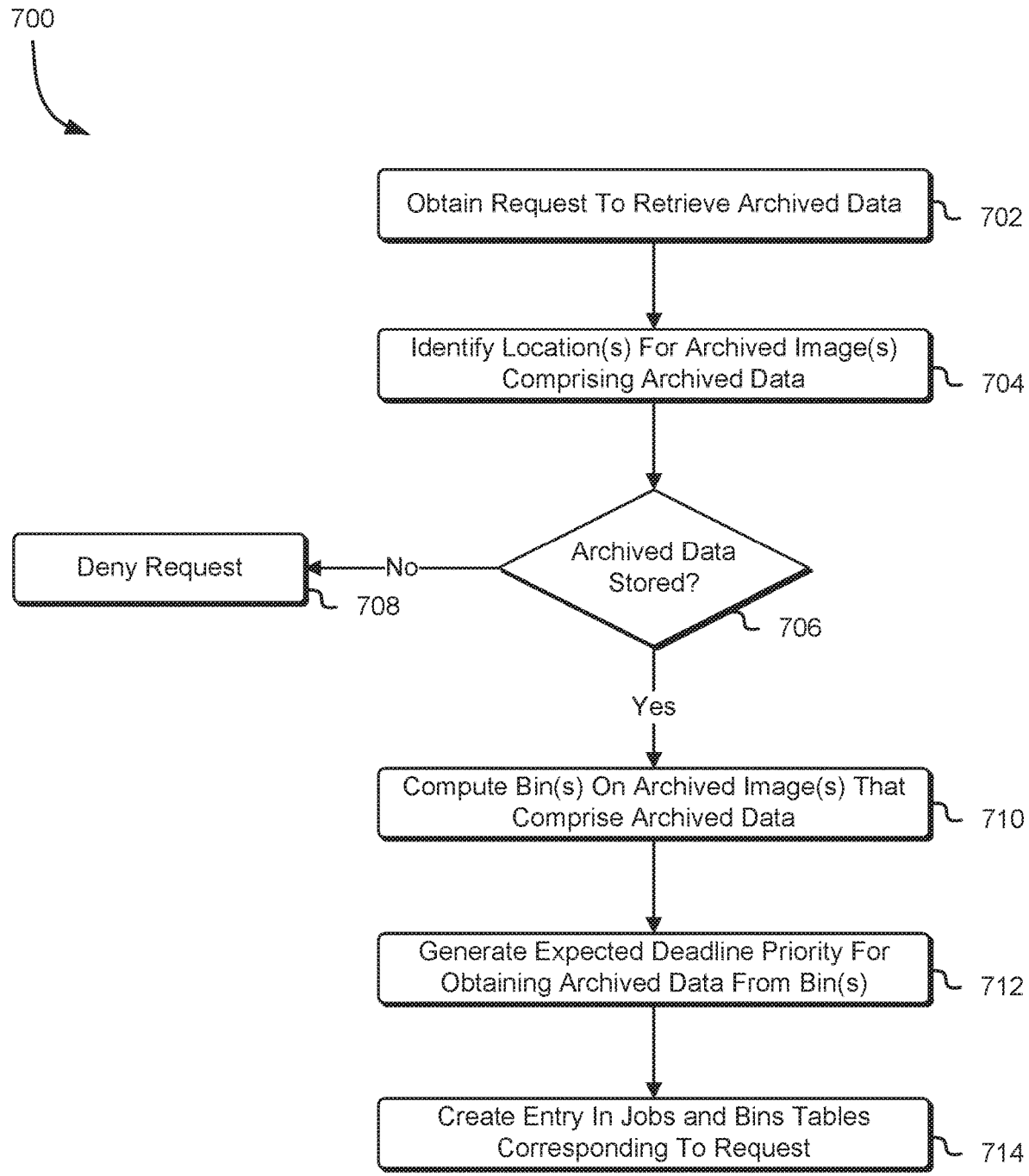
FIG. 7 shows an illustrative example of a process for computing a set of bins of an archived data image for obtaining archived data in response to a request to retrieve the archived data in accordance with at least one embodiment.

As noted above, an archival data storage service may receive a request to retrieve archived data from a set of data storage devices. The request may specify a set of identifiers corresponding to the archived data, which may be used to identify a set of data storage device images that include the archived data. An archival data storage hardware layer of the archival data storage service may compute, for the set of identified data storage images, a set of retrieval bins that may comprise a set of consecutive bytes within a data storage device and may represent a period of time for read operations on that set of consecutive bytes. Based on the parameters of the received request, the archival data storage hardware layer may generate an expected deadline priority for the request in relation to other received requests that have been either obtained or are in process of being fulfilled. This may be used to determine an ordering in which the retrieval bins are to be processed to fulfill requests within their respective deadlines. Accordingly, FIG. 7 shows an illustrative example of a process 700 for computing a set of retrieval bins of an archived data storage device image for obtaining archived data in response to a request to retrieve the archived data in accordance with at least one embodiment. The process 700 may be performed by the aforementioned archival data storage hardware layer in conjunction with a request processing sub-system, task metadata sub-system, and archival image identification agent of the archival data storage service.

At any time, the request processing sub-system of the archival data storage service may obtain 702 a request from a client of the archival data storage service or other entity to retrieve archived data that may be stored within one or more data storage devices of the archival data storage service. The request may specify a deadline or other timing parameter for retrieval of the archived data. This deadline or other timing parameter may set an upper bound for the amount of time allotted for retrieval of the archived data. The request may, in some instances, also specify an identifier corresponding to a task for retrieval of the archived data. For instance, the request processing sub-system may provide the client with a unique task identifier corresponding to the processing of a request to obtain archived data. This unique task identifier may be used to determine the status of the request or to obtain archived data that has been retrieved in response to an earlier request.

If the request from the client 402 specifies an identifier corresponding to a task for retrieval of the archived data, the request processing sub-system 404 may query a task metadata sub-system 406 of the archival data storage service to determine whether the task has been completed. The task metadata sub-system 406 may access a task metadata database that includes an entry corresponding to each task performable by the archival data storage service. The task metadata database may include an entry corresponding to each received request to obtain archived data from the archival data storage service. Each entry may specify the status of the corresponding request. For instance, if the request is being processed by the archival data storage service, the entry corresponding to this request may specify that the request is being processed. Alternatively, if the data associated with the request has been retrieved, the entry corresponding to this request may specify a network address of a data object maintained by the object-based data storage service that includes the retrieved data.

If the request includes a unique task identifier, the request processing sub-system may provide the unique task identifier to a task metadata sub-system to determine the status of the initial request to obtain the archived data. Based on the status of the request, the task metadata sub-system may transmit a response to the request processing sub-system that indicates the status of the client's request. For instance, if the requested data has been retrieved, the task metadata sub-system may provide the request processing sub-system with the network address of the data object that includes the retrieved data. This may cause the request processing sub-system to access the data object to obtain the data and to provide the data to the client to fulfill the request. Alternatively, the request processing sub-system may provide the network address of the data object to the client to enable the client to access the data object to retrieve the requested data.

However, if the request to retrieve the archived data does not include a unique task identifier, the request processing sub-system may determine that this is an initial request to obtain the archived data identified in the request. Further, the request processing sub-system, through the task metadata sub-system, may assign a unique task identifier for this initial request, which the client or other entity may use to determine the status of the initial request. In response to the request from the client or other entity, the request processing sub-system, in conjunction with an archival image identification agent, may identify 704 the one or more locations for data storage images that may comprise the requested archived data. The request processing sub-system may provide the request, including the identifiers corresponding to the archived data, to the archival image identification agent for identification of the archival data storage images that include the requested archived data.

In an embodiment, the archival image identification agent queries an image map database to identify 704 the data storage device images that comprise the data specified in the request. As noted above, the request may include one or more identifiers corresponding to the data to be retrieved from the archival data storage service. The data to be retrieved may be included in one or more data storage device images, which may each be associated with a particular data storage device of the archival data storage service. Using the one or more identifiers corresponding to the data that is to be retrieved, the archival image identification agent may query the image map database to identify the one or more data storage device images that comprise the requested data. For instance, the image map database may include an entry for each data storage device image maintained by the archival data storage service. Each entry may specify identifiers of data included in the data storage device image. Thus, the archival image identification agent may identify one or more entries of data storage device images that comprise the requested data.

Based on this query of the image map database, the archival image identification agent may determine 706 whether the requested archived data is stored within any of the data storage devices of the archival data storage service and, if so, is available for retrieval. If the archival image identification agent determines that the archived data is not available within any of the archival data storage device images, the archival image identification agent may return a response to the request processing sub-system that specifies that the archived data is not available. This may cause the request processing sub-system to deny 708 the request and indicate that the requested archived data is not available for retrieval.

If the archival image identification agent determines that the requested archived data is available for retrieval from one or more archival data storage device images, the archival image identification agent may generate an image retrieval task that specifies the archival data storage device images that comprise the archived data and the locations within these images that specifically include the archived data. The archival image identification agent may add this image retrieval task to a message queue that may be accessed by the archival data storage hardware layer for processing of the task, along with other tasks added to the queue by the archival image identification agent for other client requests to retrieve other archived data.

The archival data storage hardware layer may obtain the image retrieval task and other image retrieval tasks from the message queue. In response to obtaining these image retrieval tasks, the archival data storage hardware image may compute 710, for each of the identified archival data storage device images, a set of retrieval bins. As noted above, the size of each retrieval bin may determine the time a data storage device may spend in reading the archived data from a particular retrieval bin. The size of each retrieval bin, in an embodiment, is selected such that the total number of retrieval bins enable avoidance of significant time lag involved in changing read directions within a data storage device and to account for the potential impact of performing serpentine (e.g., back and forth) read operations within a data storage device. The retrieval bin size may be a constant value (e.g., a consistent number of seconds of read operation time, etc.) to enable rapid retrieval of data from each retrieval bin while providing an upper bound for the number of retrieval bins for a data storage device. Additionally, or alternatively, the retrieval bin size may be dynamically selected based on client traffic on a particular data storage device image. In an embodiment, a data storage device image can be divided into retrieval bins of varying sizes based on the client traffic on the data storage device image. For instance, segments of the data storage device image that are frequently accessed may be apportioned a larger retrieval bin size to enable retrieval of data that is requested more often than other data within the data storage device image.

The archival data storage hardware layer may evaluate each of the image retrieval tasks to determine the deadlines for each client request and the corresponding retrieval bins that comprise the archived data associated with each client request. The archival data storage hardware layer may use these deadlines to generate 712 the expected deadline priority for obtaining the archived data associated with each client request from the corresponding retrieval bins. For instance, for a client request having a short deadline, the archival data storage hardware layer may prioritize this client request over other received requests. For this particular client request, access to the retrieval bins that comprise the archived data identified in the client request may be prioritized to ensure that the archived data is retrieved prior to the deadline. In an embodiment, the archival data storage hardware layer creates 714 an entry within each of a jobs-bins table, a bins-jobs table, and a bins table corresponding to each client request.

The jobs-bins table may include an entry for each client request obtained by the archival data storage service. The entry corresponding to the client request may specify the unique task identifier for the client request, the retrieval bin length (e.g., time span for read operations on the retrieval bins that comprise the archived data), an identifier corresponding to the archival data storage device image that includes the archived data, the deadline for fulfillment of the client request, and the bit set of the retrieval bins that the client request is a part of. The entry may be deleted from the jobs table once the archival data storage hardware layer receives a notification from the optimization sub-system that the archived data associated with the client request has been retrieved from the specified retrieval bins for the entry.

The bins-jobs table may provide retrieval bin to data retrieval task aggregation. When a retrieval bin is retrieved, it is used to identify the data retrieval tasks (e.g., client requests) belonging to the retrieval bin. Thus, the bins table may include an entry corresponding to each retrieval bin. Further, each entry may specify the identifiers for each data retrieval task associated with the corresponding retrieval bin. When an entry from the jobs-bins table is successfully deleted (e.g., the data retrieval task has been completed), the identifiers corresponding to the completed tasks are removed from the bins-jobs table entries.

The bins table may be used to track the progress of retrieving the specific retrieval bins from the archival data storage device images. Each entry in the bins table may include a retrieval plan along with a completion marker. Once a retrieval bin has been retrieved successfully, an expiration time is assigned to the retrieval bin after which the entry corresponding to the retrieval bin becomes eligible to be deleted from the bins table. If another data retrieval task for the retrieval bin arrives, the expiration time for the entry may be extended. With every new data retrieval task, the retrieval bin deadline may be updated if the retrieval bin has not already been retrieved. In an embodiment, every time a retrieval bin is created, a random token is assigned. This token may be used by the optimization sub-system to identify if a new data retrieval task that includes retrieval of data from the retrieval bin has been received. An entry in the bins table may be eligible for deletion if the retrieval bin has been retrieved and the entry has expired.

Figure 8:
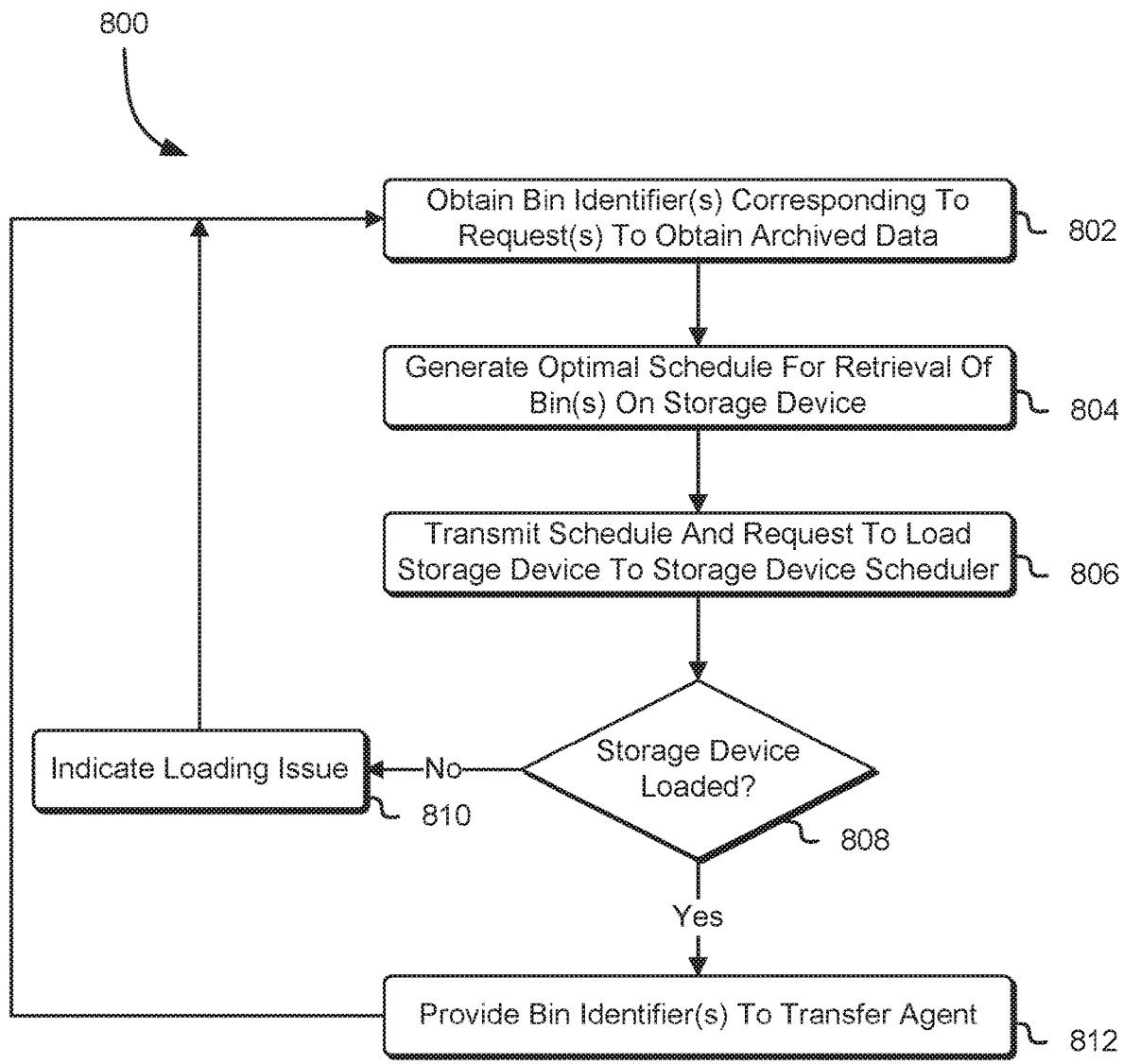
FIG. 8 shows an illustrative example of a process for generating an optimized schedule for retrieval of bins from a data storage device for retrieval of archived data specified in requests to an archival data storage service in accordance with at least one embodiment.

As noted above, an optimization sub-system of the archival data storage service may generate an optimized schedule for retrieval of archived data from the retrieval bins computed by the archival data storage hardware layer. The optimization sub-system, in an embodiment, evaluates the schedule and the retrieval bin identifiers from the archival data storage hardware layer to determine a schedule for loading the data storage devices of the archival data storage service that comprise the data identified in the image retrieval tasks processed by the archival data storage hardware layer. Based on this newly generated schedule, the optimization sub-system may transmit requests to data storage device scheduler of a data storage device library to load a data storage device for retrieval of archived data from the retrieval bins. Accordingly, FIG. 8 shows an illustrative example of a process 800 for generating an optimized schedule for retrieval of bins from a data storage device for retrieval of archived data specified in requests to an archival data storage service in accordance with at least one embodiment. The process 800 may be performed by the aforementioned optimization sub-system of the archival data storage service.

The optimization sub-system, in an embodiment, obtains 802 the retrieval bin identifiers corresponding to requests to obtain archived data. The optimization sub-system may obtain, from the archival data storage hardware layer, a schedule specifying an ordering in which the retrieval bins are to be processed for fulfillment of data retrieval requests. In some instances, the archival data storage hardware layer may transmit a notification to the optimization sub-system that the jobs-bins, bins-jobs, and bins tables have been updated in response to processing of new client requests to obtain archived data. This may cause the optimization sub-system to access these tables to identify the schedule generated by the archival data storage hardware layer for retrieval of the archived data.

The optimization sub-system may evaluate the schedule and the retrieval bin identifiers from the archival data storage hardware layer to generate 804 an optimized schedule for loading the data storage devices of the archival data storage service that comprise the archived data identified in the image retrieval tasks processed by the archival data storage hardware layer. As noted above, an optimization sub-system may exist for each data storage device library of the archival data storage service. The optimization sub-system may monitor the state of its assigned data storage device library and prepare, based on the state of the data storage device library and the schedule from the archival data storage hardware layer, a schedule for loading of the data storage devices that comprise the retrieval bins specified in the schedule from the archival data storage hardware layer. The schedule prepared by the optimization sub-system may correspond to every data storage library of the archival data storage service.

The optimization sub-system may transmit 806 the newly created schedule to a data storage device scheduler of the data storage device library, along with a request to initiate loading of the data storage devices in accordance with the newly created schedule. This may cause the data storage device scheduler to process the request from the optimization sub-system and load, from the data storage device library, one or more data storage devices for retrieval of the specified retrieval bins. In an embodiment, if the one or more data storage devices are loaded successfully, the data storage device scheduler transmits a notification to the optimization sub-system to indicate that the one or more data storage devices have been loaded successfully. Alternatively, if the data storage device scheduler determines that a data storage device or the data storage device library is unavailable for retrieval of archived data, the data storage device scheduler may transmit a notification to the optimization sub-system to indicate that the data storage device or library is unavailable for use.

Based on the notification obtained from the data storage device scheduler, the optimization sub-system may determine 808 whether the data storage device indicated in the schedule has been loaded successfully. If the optimization sub-system determines that the data storage device has not been loaded successfully (e.g., the data storage device and/or library are unavailable), the optimization sub-system may indicate 810 a loading issue. This may include updating the deadline priority for retrieval of the archived data from the affected retrieval bins within the tables described above. In an embodiment, if a data storage device library is rendered inoperative or is otherwise unavailable, the optimization sub-system re-issues its schedule to data storage device schedulers of other data storage device libraries that include copies of the requested data. This may cause these other data storage device schedulers to load the corresponding data storage devices of these other data storage device libraries to obtain the copies of the retrieval bins that include the requested data. This may result in parity (e.g., multiple) retrieval bin retrievals for the same data from various data storage device libraries.

If the one or more data storage devices are loaded successfully, the optimization sub-system may provide 812 the retrieval bin identifiers corresponding to the retrieval bins obtained from the one or more data storage devices to an archival data transfer agent of the archival data storage service. The archival data transfer agent may interact with the data storage devices of the data storage device library to obtain the retrieval bins from these data storage devices. In an embodiment, the archival data transfer agent constructs an optimal ordering for retrieval of the retrieval bins identified by the optimization sub-system. For instance, the archival data transfer agent may determine which data storage devices have been loaded successfully and, based on this, generate the optimized ordering for retrieval of the retrieval bins in these data storage devices. The optimized ordering for retrieval of the retrieval bins may be based on the prioritization of client requests to obtain archived data from the archival data storage service, as discussed above. The optimization sub-system may repeat the process 800 after providing the retrieval bin identifiers to the transfer agent. This allows for updates to be made to the schedule for retrieval of the retrieval bins based on the deadline priority of any pending data retrieval tasks.

Figure 9:
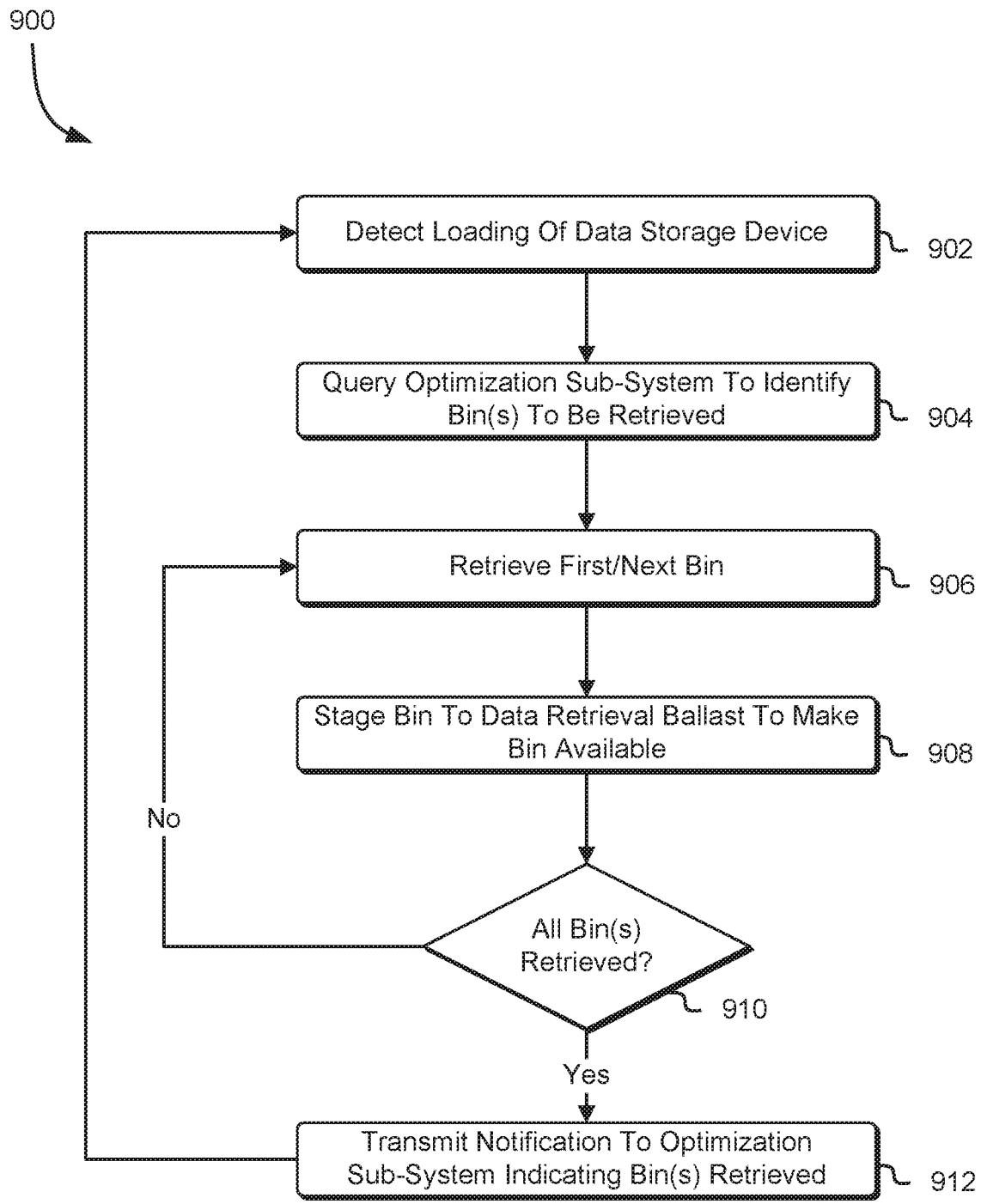
FIG. 9 shows an illustrative example of a process for retrieving a set of bins from a data storage device to make the set of bins available for obtaining archived data and compiling the archived data based on an ordering of the archived data and of the bins in accordance with at least one embodiment.

As noted above, the archival data transfer agent may retrieve the archived data from retrieval bins of a data storage device that are associated with one or more data retrieval tasks. The archival data transfer agent may stage the archived data from each of the retrieval bins processed from the data storage device into a data retrieval ballast to make the archived data available. Once all retrieval bins from the data storage device that associated with the one or more data retrieval tasks have been retrieved and stored within the data retrieval ballast, the archival data transfer agent may transmit a notification to the optimization sub-system to indicate that the archived data from the identified retrieval bins is available from the data retrieval ballast. Accordingly, FIG. 9 shows an illustrative example of a process 900 for retrieving a set of bins from a data storage device to make the set of bins available for obtaining archived data and compiling the archived data based on an ordering of the archived data and of the bins in accordance with at least one embodiment. The process 900 may be performed by the aforementioned archival data transfer agent of the archival data storage service.

If the one or more data storage devices are loaded successfully, the optimization sub-system may transmit the schedule for obtaining the retrieval bins from the one or more data storage devices to an archival data transfer agent of the archival data storage service. This may cause the archival data transfer agent to detect 902 loading of a data storage device by the data storage device scheduler from the data storage device library. In response to detecting that a data storage device has been loaded successfully, the archival data transfer agent may query 904 the optimization sub-system to identify the retrieval bins that are to be retrieved from the data storage device. In some instances, the retrieval bins to be retrieved are specified in the schedule provided by the optimization sub-system. Alternatively, the optimization sub-system may provide the identifiers corresponding to the retrieval bins included in the data storage device to the archival data transfer agent in response to the query.

Based on the schedule, the archival data transfer agent may interact with the loaded data storage device of the data storage device library to retrieve 906 the first retrieval bin. The archival data transfer agent may perform a read operation on the data storage device to retrieve the consecutive series of bytes of the retrieval bin in order in which the data was written to the data storage device. The archival data transfer agent may stage 908 the archived data from this first retrieval bin to the data retrieval ballast to make this archived data available for fulfillment of client requests to retrieve data from the archival data storage service.

Once the archived data from a retrieval bin has been staged, the archival data transfer agent may determine 910 whether all retrieval bins of the data storage device identified by the optimization sub-system have been retrieved and staged. If less than all retrieval bins have been retrieved and staged, the archival data transfer agent may select the next retrieval bin from the schedule and retrieve 906 this retrieval bin from the data storage device, thus continuing the staging of archived data from the retrieval bins specified in the schedule or otherwise identified by the optimization sub-system. However, if the archival data transfer agent determines that all retrieval bins specified by the optimization sub-system have been retrieved and staged within the data retrieval ballast, the archival data transfer agent may transmit 912 a notification to the optimization sub-system to indicate that the retrieval bins identified by the optimization sub-system have been retrieved.

In an embodiment, once a retrieval bin has been obtained from the data storage device library, the archival data transfer agent transmits a completion notification to the optimization sub-system to indicate that the retrieval bin has been obtained. This may cause the optimization sub-system to coordinate with the archival data storage hardware layer to determine whether the schedule for retrieval of the retrieval bins is to be updated based on newly obtained data retrieval requests, as any of these newly obtained data retrieval requests may indicate a higher priority for retrieving data from the data storage device library or other device libraries. Thus, rather than transmitting a notification once all retrieval bins have been retrieved from a data storage device, the archival data transfer agent may transmit a notification after processing each retrieval bin. This may enable the optimization sub-system to update its schedule for processing of the retrieval bins as new requests are being received by the archival data storage service.

Figure 10:
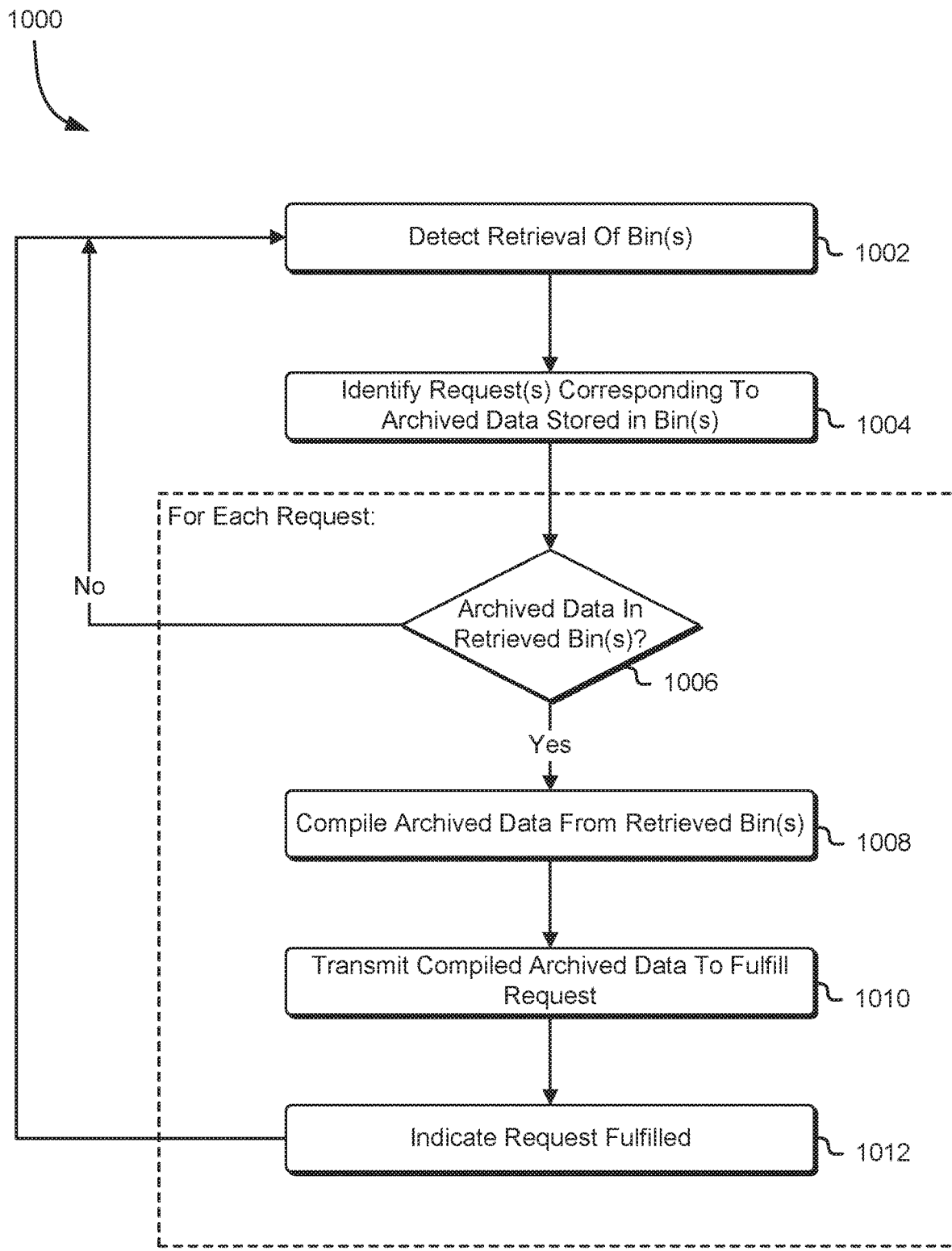
FIG. 10 shows an illustrative example of a process for compiling archived data from a set of retrieved bins of a set of data storage devices of an archival data storage service in accordance with at least one embodiment.

As noted above, the archival data storage hardware layer may receive a notification from the optimization sub-system that the data associated with a particular retrieval bin is available in the data retrieval ballast. This notification may cause the archival data storage hardware layer to access the data retrieval ballast. For each client request, the archival data storage hardware layer may evaluate the data from the retrieved retrieval bins to determine whether the data required to fulfill a client request is now available. If so, the archival data storage hardware layer may compile the data from the retrieval bins stored in the data retrieval ballast and transmit the compiled data to the client to fulfill the client request. Additionally, the archival data storage hardware layer may indicate, by updating its schedule, that the client request has been fulfilled. Accordingly, FIG. 10 shows an illustrative example of a process 1000 for compiling archived data from a set of retrieved bins of a set of data storage devices of an archival data storage service in accordance with at least one embodiment. The process 1000 may be performed by the aforementioned archival data storage hardware layer, which may process notifications from the optimization sub-system to determine whether compilation of data identified in a client request is possible for fulfillment of the request.

At any time, the archival data storage hardware layer may detect 1002 that a retrieval bin has been retrieved from a data storage device and that the data within the retrieval bin has been written to a data retrieval ballast within an object-based data storage service. For instance, the archival data storage hardware layer may receive a notification from the optimization sub-system that provides an indication that a retrieval bin has been successfully processed by the archival data transfer agent. Alternatively, the archival data storage hardware layer may evaluate the tables described above to identify any retrieval bins that have been successfully processed by the archival data transfer agent.

In response to detecting successful retrieval of one or more retrieval bins from a data storage device, the archival data storage hardware layer may identify 1004 the one or more requests corresponding to the archived data obtained from the one or more retrieval bins. For instance, the archival data storage hardware layer may access the jobs-bins and the bins-jobs tables to identify, based on identifiers of the retrieval bins processed by the archival data transfer agent, the client requests for archived data that includes the data obtained from the retrieval bins.

For each client request, the archival data storage hardware layer may determine 1006 whether the archived data necessary for fulfillment of the request is available within the data retrieval ballast as a result of processing of the one or more retrieval bins. If the archival data storage hardware layer determines that portions of the archived data are still missing (e.g., have not been obtained from the data storage devices), the archival data storage hardware layer may continue to monitor for successful processing of other retrieval bins from the data storage object and other data storage objects. However, if the archival data storage hardware layer determines that the archived data necessary for fulfillment of the client request is available within the data retrieval ballast, the archival data storage hardware layer may compile 1008 the archived data in the data retrieval ballast.

The archival data storage hardware layer may transmit 1010 the compiled archived data to the client to fulfill the request. Alternatively, the archival data storage hardware layer may store the compiled archived data in a data object of the object-based data storage service. The archival data storage hardware layer may provide the network address of the data object to the request processing sub-system of the archival data storage service. In response to receiving this network address, the request processing sub-system may use the network address to access the data object, retrieve the compiled archived data, and provide the compiled archived data to the client. The request processing sub-system may access the data object in response to a new request from the client to determine the status of its initial data retrieval request or immediately upon receiving the network address from the archival data storage hardware layer. In an embodiment, the request processing sub-system provides, instead of the compiled archived data, the network address of the data object used to store the compiled archived data to the client. Thus, the client may obtain the compiled archived data by utilizing the provided network address to access the data object.

The archival data storage hardware layer may indicate 1012 that the client request has been fulfilled once the compiled archived data has been provided to the client or otherwise stored in the data object. The archival data storage hardware layer may update the jobs-bins table and the bins-jobs table to remove entries and identifiers, respectively, corresponding to the fulfilled client request. The archival data storage hardware layer may continue performing the process 1000 as retrieval bins are being processed in response to newly received client requests to obtain archived data from the archival data storage service.

Figure 11:
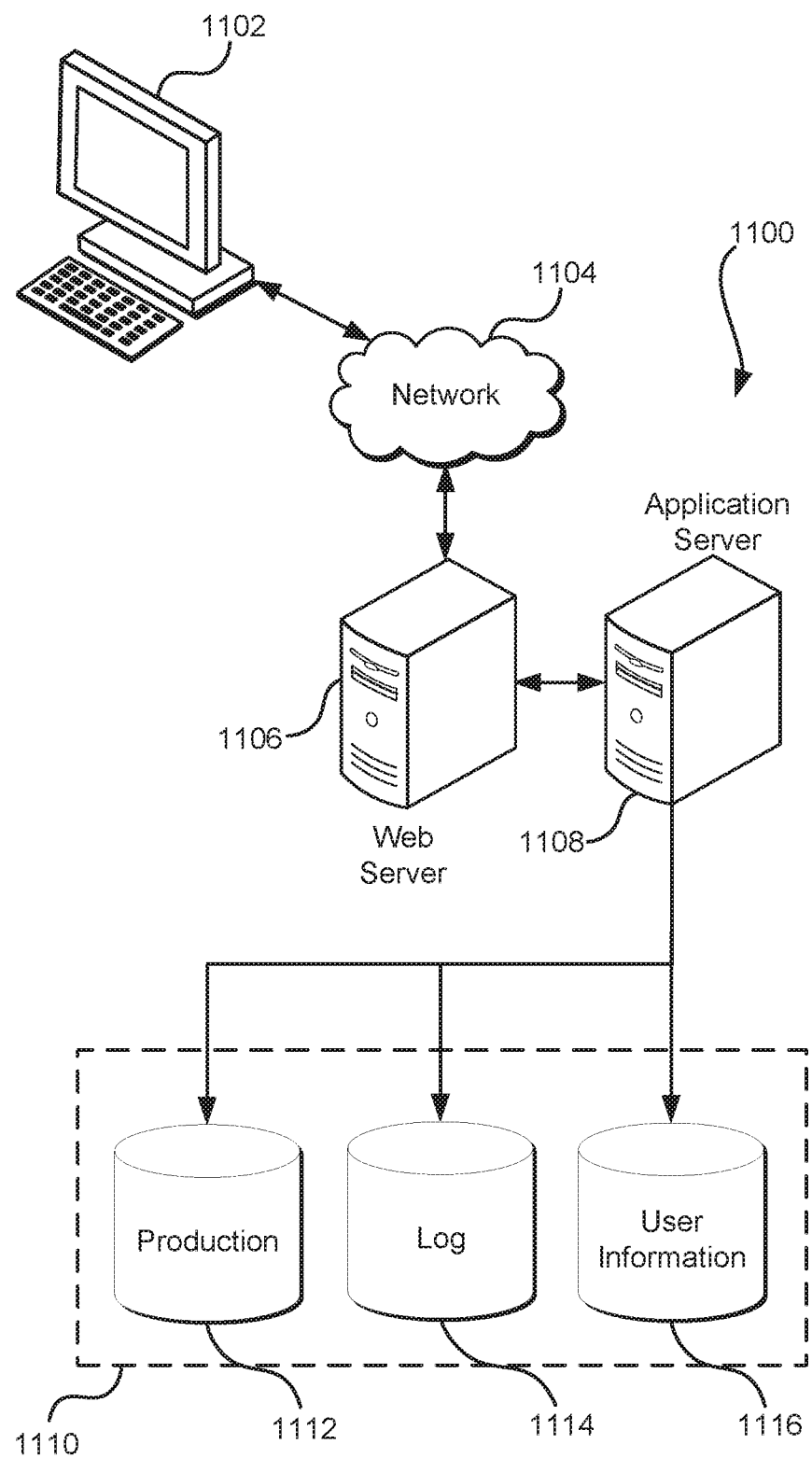
FIG. 11 shows an illustrative example of a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art. In an embodiment, the web server 1106 is the request processing sub-system of the archival data storage service described above. Thus, the web server 1106 may obtain, from an electronic client device 1102, requests to retrieve archived data from one or more data storage devices of the archival data storage service.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

In an embodiment, the application server 1108 includes the archival data storage hardware layer, optimization subsystem, and other components described in connection with FIG. 3 as being associated with the archival data storage service. The application server 1108 may interact with an object-based data storage service to store data retrieved from a set of retrieval bins of the archival data storage devices and to make the data available to electronic client devices 1102 for fulfillment of requests from the electronic client devices 1102. Further, the application server 1108 may access one or more message queues to identify new requests to retrieve archived data and, accordingly, prepare an optimized schedule for retrieval of the archived data from the set of retrieval bins.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining a request to retrieve archived data;
   identifying, from a fleet of data storage devices, a set of data storage devices comprising the archived data;
   identifying, for each data storage device of the set of data storage devices, a set of bins comprising the archived data;
   generating a schedule for retrieval of the set of bins based on a deadline specified in the request for retrieval of the archived data, the schedule based at least in part on an order in which the archived data was written to the set of bins;
   obtaining, in accordance with the schedule, individual bins of the set of bins, wherein the schedule is updated upon retrieval of an individual bin of the set of bins;
   obtaining, collectively from the set of bins, the archived data in the order in which the archived data was written to the set of bins; and
   fulfilling the request by at least compiling the archived data.

2. The computer-implemented method of claim 1, wherein:
   the request specifies an identifier corresponding to the archived data; and
   the method further comprises:
      querying, using the identifier, a database comprising a set of entries corresponding to the fleet of data storage devices to identify a set of entries corresponding to the set of data storage devices;
      identifying, from the set of entries, locations of the archived data within the set of data storage devices; and
      identifying, based on the locations, a subset of the set of bins comprising the archived data.

3. The computer-implemented method of claim 1, further comprising:
   storing data, from the individual bin of the set of bins, in a data object;
   accessing the data object to determine whether the data includes the archived data; and
   as a result of the data object including the archived data, compiling the archived data.

4. The computer-implemented method of claim 1, further comprising modifying, in response to retrieval of a bin of the set of bins, the schedule based on a set of deadlines specified in other requests to retrieve other archived data.

5. A system, comprising:
   one or more processors; and
   memory comprising computer-executable instructions that, upon execution by the one or more processors, cause the system to:
      identify, in response to a request to retrieve data, a set of data storage devices comprising the data;
      identify, for each data storage device of the set of data storage devices, a set of bins whereby a subset of the set of bins collectively comprise the data;
      generate, based at least in part on an order in which the data was written to the set of bins, a schedule for retrieval of the set of bins in accordance with a deadline specified in the request for making the data available for retrieval;
      provide the schedule to cause the retrieval of the set of bins in accordance with the schedule; and
      obtain the data from the set of bins in the order in which the archived data was written to the set of bins, wherein the schedule is updated upon retrieval of the data from the set of bins.

6. The system of claim 5, wherein the set of bins are identified such that individual bins of the set of bins are readable within a threshold period of time.

7. The system of claim 5, wherein the computer-executable instructions that cause the system to generate the schedule further cause the system to:
   obtain another schedule for the retrieval of the set of bins, the another schedule generated in accordance with other deadlines specified in other requests for retrieval of other data from the set of data storage devices; and
   modify the another schedule to account for the deadline specified in the request, resulting in the schedule.

8. The system of claim 5, wherein the computer-executable instructions further cause the system to:
   detect that a bin of the set of bins has been retrieved;
   determine whether additional requests have been obtained to retrieve other data from the set of bins;
   as a result of a determination that the additional requests have been obtained, update the schedule in accordance with deadlines specified in the additional requests; and
   provide the schedule to cause retrieval of remaining bins of the set of bins in accordance with the schedule.

9. The system of claim 5, wherein the computer-executable instructions that cause the system to identify the set of bins further cause the system to:
retrieve, from a data object and for each data storage device of the set of data storage devices, a data storage device header, the data storage device header specifying at least a location of a subset of the data; and
determine, based on the location of the subset of the data, a bin that includes the subset of the data.

10. The system of claim 5, wherein the computer-executable instructions further cause the system to:
detect that a bin of the set of bins has been retrieved;
evaluate archived data from the bin and other archived data obtained from other bins to determine whether the request can be fulfilled; and
as a result of a determination that the request can be fulfilled, compile a subset of the archived data and a subset of the other archived data, each corresponding to the data, to generate the data.

11. The system of claim 5, wherein the set of bins are identified based on an evaluation of network traffic to each data storage device of the set of data storage devices.

12. The system of claim 5, wherein the computer-executable instructions further cause the one or more processors to:
determine that the request has been fulfilled;
update the schedule based on deadlines of remaining requests to obtain other data from the set of bins yet to be fulfilled; and
provide the schedule to cause the retrieval of the set of bins in accordance with the schedule.

13. A non-transitory computer-readable storage medium comprising executable instructions that, upon execution by one or more processors of a computer system, cause the computer system to:
evaluate a set of requests to obtain archived data to identify a set of data storage devices that collectively comprise the archived data;
identify, for each data storage device of the set of data storage devices, a set of bins whereby a subset of the set of bins collectively comprise the archived data;
generate a schedule for retrieval of the archived data from the set of bins in accordance with deadlines specified in the set of requests for fulfillment of each request of the set of requests, the schedule based at least in part on an order in which the archived data was written to the set of bins;
provide the schedule to cause the retrieval of the set of bins in accordance with the schedule; and
obtain, in the order in which the archived data was written to the set of bins, the archived data from the set of bins, wherein the schedule is updated upon retrieval of the archived data from individual bins of the set of bins.

14. The non-transitory computer-readable storage medium of claim 13, wherein the executable instructions further cause the computer system to:
obtain a new request to obtain other archived data from the set of data storage devices;
identify a deadline for fulfillment of the new request; and
update the schedule to account for the deadline specified in the new request.

15. The non-transitory computer-readable storage medium of claim 13, wherein the executable instructions further cause the computer system to:
detect retrieval of a bin of the set of bins;
identify a storage location for data retrieved from the bin;
evaluate the data and other data from the storage location to determine whether a request from the set of requests can be fulfilled; and
as a result of a determination that the request can be fulfilled, compile a subset of the data and a subset of the other data to generate compiled data for fulfillment of the request.

16. The non-transitory computer-readable storage medium of claim 15, wherein the executable instructions further cause the computer system to:
update the schedule based on remaining deadlines of a set of requests yet to be fulfilled; and
provide the schedule to cause the retrieval of the set of bins in accordance with the schedule.

17. The non-transitory computer-readable storage medium of claim 15, wherein the executable instructions further cause the computer system to:
store the compiled data in a data object; and
provide a network address of the data object to retrieve the compiled data from the data object.

18. The non-transitory computer-readable storage medium of claim 13, wherein identification of the set of bins is based on network traffic of each data storage device of the set of data storage devices.

19. The non-transitory computer-readable storage medium of claim 13, wherein identification of the set of bins is based on periods of time set forth in the deadlines specified in the set of requests.

20. The non-transitory computer-readable storage medium of claim 13, wherein the executable instructions further cause the computer system to:
detect that a bin of the set of bins has been retrieved;
evaluate additional requests obtained to retrieve other data from the set of bins;
update the schedule in accordance with other deadlines specified in the additional requests; and
provide the schedule to cause retrieval of remaining bins of the set of bins in accordance with the schedule.

* * * * *